United States Patent
Liu et al.

(10) Patent No.: US 10,743,257 B2
(45) Date of Patent: Aug. 11, 2020

(54) TECHNIQUES AND APPARATUSES FOR WAKEUP SIGNAL TRANSMISSION

(71) Applicant: QUALCOMM Incorporated, San Diego, CA (US)

(72) Inventors: Le Liu, Fremont, CA (US); Alberto Rico Alvarino, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/127,036

(22) Filed: Sep. 10, 2018

(65) Prior Publication Data
US 2019/0090192 A1    Mar. 21, 2019

Related U.S. Application Data

(60) Provisional application No. 62/559,356, filed on Sep. 15, 2017, provisional application No. 62/585,430, (Continued)

(51) Int. Cl.
*H04W 52/02* (2009.01)

(52) U.S. Cl.
CPC ..... *H04W 52/0229* (2013.01); *H04W 52/028* (2013.01)

(58) Field of Classification Search
CPC ......... H04W 52/0229; H04W 28/0215; H04W 72/048; H04W 72/08; H04W 56/0045
See application file for complete search history.

(56) References Cited

U.S. PATENT DOCUMENTS 7,398,408 B2 *   7/2008   Paljug .................. G06F 1/3209
                                                                713/323
9,125,152 B2     9/2015   Zhu et al.
(Continued)

FOREIGN PATENT DOCUMENTS

WO    WO-2017039372 A1    3/2017

OTHER PUBLICATIONS

Qualcomm Incorporated: "Efficient Monitoring of DL Control Channels", 3GPP Draft; R1-1708802 Efficient Monitoring of DL Control Channels, 3rd Generation Partnership Project (3GPP), Mobile Competence Centre; 650, Route Des Lucioles; F-06921 Sophia-Antipolis Cedex; FRA, vol. RAN WG1, No. Hangzhou, China; May 15, 2017-May 19, 2017, May 14, 2017 (May 14, 2017), pp. 1-10, XP051273985, Retrieved from the Internet: URL: http://www.3gpp.org/ftp/Meetings_3GPP_SYNC/RAN1/Docs/ [retrieved on May 14, 2017].
(Continued)

*Primary Examiner* — Rasheed Gidado
(74) *Attorney, Agent, or Firm* — Nerrie M. Zohn; Harrity & Harrity, LLP

(57) ABSTRACT

A method, an apparatus, a base station, a user equipment (UE), and a computer program product for wireless communication are provided. The base station may encode a wakeup signal so that a preamble of the wakeup signal indicates whether the wakeup signal is relevant to the UE. The UE may select a technique for detecting the wakeup signal based at least in part on a partial, full, or no synchronization. In some aspects, the wakeup signal may be encoded with a system frame number. In some aspects, wakeup signals for guardband/standalone UEs are provided. Numerous other aspects are provided.

36 Claims, 16 Drawing Sheets

Related U.S. Application Data filed on Nov. 13, 2017, provisional application No. 62/666,673, filed on May 3, 2018.

(56) References Cited

U.S. PATENT DOCUMENTS

| | | | |
|---|---|---|---|
| 9,525,540 B1* | 12/2016 | Shellhammer | H04L 7/0012 |
| 2008/0107157 A1 | 5/2008 | De Ruijter | |
| 2010/0203892 A1 | 8/2010 | Nagaraja et al. | |
| 2010/0312554 A1* | 12/2010 | Pietsch | H04J 3/0611 |
| | | | 704/227 |
| 2013/0343322 A1* | 12/2013 | Lee | H04B 7/2656 |
| | | | 370/329 |
| 2014/0302855 A1 | 10/2014 | Nory et al. | |
| 2014/0348094 A1 | 11/2014 | Charbit et al. | |
| 2015/0003422 A1 | 1/2015 | Jin et al. | |
| 2016/0278013 A1* | 9/2016 | Shellhammer | H04W 52/0225 |
| 2016/0366644 A1 | 12/2016 | Ghosh et al. | |
| 2016/0374018 A1* | 12/2016 | Min | H04W 52/0229 |
| 2017/0013553 A1 | 1/2017 | Huang et al. | |
| 2017/0093530 A1* | 3/2017 | Kudekar | H04L 1/0668 |
| 2017/0093540 A1 | 3/2017 | Lei et al. | |
| 2017/0295050 A1* | 10/2017 | Chang | H04L 27/2628 |
| 2018/0287846 A1 | 10/2018 | Kim et al. | |
| 2019/0090193 A1 | 3/2019 | Liu et al. | |
| 2019/0313337 A1* | 10/2019 | Wilhelmsson | H04L 5/0048 |

OTHER PUBLICATIONS

International Search Report and Written Opinion—PCT/US2018/050486—ISA/EPO—dated Dec. 19, 2018.

Qualcomm Incorporated: "Efficient Monitoring of DL Control Channels," 3GPP Draft; R1-1712806 Efficient Monitoring of DL Control Channels, 3rd Generation Partnership Project (3GPP), Mobile Competence Centre; 650, Route Des Lucioles; F-06921 Sophia-Antipolis Cedex; FRA, vol. RAN WG1, No. Prague, Czechia; Aug. 21, 2017-Aug. 25, 2017, Aug. 20, 2017, XP051315618, 12 pages, Retrieved from the Internet: URL: http://www.3gpp.org/ftp/Meetings_3GPP_SYNC/RAN1/Docs/ [retrieved on Aug. 20, 2017].

* cited by examiner

TECHNIQUES AND APPARATUSES FOR WAKEUP SIGNAL TRANSMISSION

CROSS-REFERENCE TO RELATED APPLICATIONS UNDER 35 U.S.C. & 119

This application claims priority to U.S. Provisional Patent Application No. 62/559,356, filed on Sep. 15, 2017, entitled "TECHNIQUES AND APPARATUSES FOR WAKEUP SIGNAL TRANSMISSION IN 5G,", U.S. Provisional Patent Application No. 62/585,430, filed on Nov. 13, 2017, entitled "TECHNIQUES AND APPARATUSES FOR WAKEUP SIGNAL TRANSMISSION IN 5G," and U.S. Provisional Patent Application No. 62/666,673, filed on May 3, 2018, entitled "TECHNIQUES AND APPARATUSES FOR WAKEUP SIGNAL TRANSMISSION IN 5G," which is hereby expressly incorporated by reference herein.

BACKGROUND

Field

Aspects of the present disclosure generally relate to wireless communication, and more particularly to techniques and apparatuses for wakeup signal transmission.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS may transmit a signal to a UE to indicate whether the UE should decode a subsequent communication (e.g., a downlink channel). This may improve battery efficiency of the UE because the UE may not scan for the subsequent communication unless the UE receives the signal. For example, such a signal may be termed a wakeup signal.

SUMMARY

In some cases, a wakeup signal may apply to multiple UEs. For example, by assigning UEs to two or more UE groups, all UEs of a UE group can be awakened using a single wakeup signal. This may be more efficient than transmitting a wakeup signal to a single UE, and may be more efficient than waking up all UEs (instead of only a group of UEs) for the subsequent communication. However, a UE may encounter difficulty when identifying the wakeup signal. Furthermore, it may be cumbersome to add additional information to the wakeup signal to indicate UEs to which the wakeup signal applies.

Some techniques and apparatuses described herein may provide for the wakeup signal to be encoded with a preamble that indicates whether the wakeup signal is associated with a particular group of UEs. This encoding can span across multiple, different symbols, or may be applied with regard to a single symbol. In some aspects, the preamble may indicate a system frame number (SFN), which may enable a UE to identify a wakeup signal without reading a physical broadcast channel (PBCH). Furthermore, some techniques and apparatuses described herein may provide for encoding of the wakeup signal preamble using modifications to existing sequences, codes, and/or cyclic shifts, which eliminates the need to add additional bits or size to the wakeup signal. Still further, techniques and apparatuses described herein may provide for UE-side processing of the wakeup signal with variable levels of synchronization, which improves versatility of wakeup signaling. In this way, a design for a lightweight and flexible wakeup signal is provided in a fashion that provides backward compatibility and improved UE performance.

A wakeup signal may be different for a UE in an inband mode (e.g., a UE that is configured to communicate within a wider system bandwidth, such as an LTE band) than for a UE in a guardband mode (e.g., a UE that is configured to communicate in a guardband) or a UE in a standalone mode (e.g., a UE that communicates using a dedicated carrier for a given system, such as narrowband (NB) Internet of Things (IOT) (NB-IoT), and, therefore, not in an LTE band. For example, a first N symbols (e.g., first three symbols, or another number of symbols) of an inband subframe may be occupied by a control channel, such as the LTE physical downlink control channel (PDCCH). Thus, for inband UEs, less than all symbols can be used for wakeup signal transmission. It may be beneficial, for purposes of configuration simplicity, processor efficiency, and/or the like, to increase (e.g., maximize) commonality between inband mode wakeup signals and guardband mode or standalone mode (GB/SA mode) wakeup signals.

Some techniques and apparatuses described herein provide a wakeup signal for a UE in a first deployment mode (e.g., a GB/SA mode and/or the like) that uses more symbols than a wakeup signal for a UE in a second deployment mode (e.g., an inband mode and/or the like). In some cases, at least part of the inband-mode wakeup signal is used for the GB/SA mode wakeup signal, which improves commonality between the inband-mode wakeup signal and the GB/SA mode wakeup signal. For example, the GB/SA mode wakeup signal may include the inband-mode wakeup signal with one or more repeated symbols of the inband-mode wakeup signal, or may share at least one of a Zadoff-Chu (ZC) sequence or a cover code with the inband-mode wakeup signal. In some aspects, the GB/SA mode wakeup signal may be generated by using similar components of inband wakeup signals, e.g., ZC sequence, cover codes, and/or optionally a phase shift, and using different length per subframe (e.g., may use a different ZC sequence and a different cover code), which may enhance the sequence properties, such as autocorrelation and/or cross-correlation properties between different wakeup signals corresponding to different cells.

In an aspect of the disclosure, a method performed by a base station, a method performed by a user equipment, an apparatus, a base station, a user equipment, and a computer program product are provided.

In some aspects, the method performed by the base station may include generating a wakeup signal for at least one user equipment (UE) of a UE group, wherein at least one of a portion of a UE group identifier associated with the UE group, or a portion of a cell identity associated with the UE group, is identified by a preamble of the wakeup signal; and transmitting the wakeup signal to the at least one UE.

In some aspects, the base station may include a memory and one or more processors operatively coupled to the memory. The memory and the one or more processors may be configured to generate a wakeup signal for at least one UE of a UE group, wherein at least one of a portion of a UE group identifier associated with the UE group, or a portion of a cell identity associated with the UE group, is identified by a preamble of the wakeup signal; and transmit the wakeup signal to the at least one UE.

In some aspects, the apparatus may include means for generating a wakeup signal for at least one UE of a UE group, wherein at least one of a portion of a UE group identifier associated with the UE group, or a portion of a cell identity associated with the UE group, is identified by a preamble of the wakeup signal; and means for transmitting the wakeup signal to the at least one UE.

In some aspects, the computer program product may include a non-transitory computer-readable medium storing one or more instructions that, when executed by one or more processors of a base station, cause the one or more processors to generate a wakeup signal for at least one UE of a UE group, wherein at least one of a portion of a UE group identifier associated with the UE group, or a portion of a cell identity associated with the UE group, is identified by a preamble of the wakeup signal; and transmit the wakeup signal to the at least one UE.

In some aspects, the method performed by the UE may include determining that a wakeup signal detected by the UE is associated with the UE based at least in part on the wakeup signal being for a UE group that includes the UE, wherein at least one of a portion of a UE group identifier associated with the UE group, or a portion of a cell identity associated with the UE group, is identified by a preamble of the wakeup signal; and receiving a communication based at least in part on the wakeup signal.

In some aspects, the UE may include a memory and one or more processors operatively coupled to the memory. The memory and the one or more processors may be configured to determine that a wakeup signal detected by the UE is associated with the UE based at least in part on the wakeup signal being for a UE group that includes the UE, wherein at least one of a portion of a UE group identifier associated with the UE group, or a portion of a cell identity associated with the UE group, is identified by a preamble of the wakeup signal; and receive a communication based at least in part on the wakeup signal.

In some aspects, the apparatus may include means for determining that a wakeup signal detected by the apparatus is associated with the apparatus based at least in part on the wakeup signal being for a UE group that includes the apparatus, wherein at least one of a portion of a UE group identifier associated with the UE group, or a portion of a cell identity associated with the UE group, is identified by a preamble of the wakeup signal; and means for receiving a communication based at least in part on the wakeup signal.

In some aspects, the computer program product may include a non-transitory computer-readable medium storing one or more instructions that, when executed by one or more processors of a base station, cause the one or more processors to determine that a wakeup signal detected by a UE is associated with the UE based at least in part on the wakeup signal being for a UE group that includes the UE, wherein at least one of a portion of a UE group identifier associated with the UE group, or a portion of a cell identity associated with the UE group, is identified by a preamble of the wakeup signal; and receive a communication based at least in part on the wakeup signal.

In some aspects, the method performed by the base station may include generating a wakeup signal for a user equipment (UE) in a guardband mode or a standalone mode (GB/SA mode), wherein the wakeup signal is based at least in part on a first base sequence associated with a first deployment mode, and the first base sequence includes more symbols than a second base sequence associated with a second deployment mode; and transmitting the wakeup signal.

In some aspects, the base station may include a memory and one or more processors operatively coupled to the memory. The memory and the one or more processors may be configured to generate a wakeup signal for a user equipment (UE) in a guardband mode or a standalone mode (GB/SA mode), wherein the wakeup signal is based at least in part on a first base sequence associated with a first deployment mode, and the first base sequence includes more symbols than a second base sequence associated with a second deployment mode; and transmit the wakeup signal.

In some aspects, the apparatus may include means for generating a wakeup signal for a user equipment (UE) in a guardband mode or a standalone mode (GB/SA mode), wherein the wakeup signal is based at least in part on a first base sequence associated with a first deployment mode, and the first base sequence includes more symbols than a second base sequence associated with a second deployment mode; and means for transmitting the wakeup signal.

In some aspects, the computer program product may include a non-transitory computer-readable medium storing one or more instructions that, when executed by one or more processors of a base station, cause the one or more processors to generate a wakeup signal for a user equipment (UE) in a guardband mode or a standalone mode (GB/SA mode), wherein the wakeup signal is based at least in part on a first base sequence associated with a first deployment mode, and the first base sequence includes more symbols than a second base sequence associated with a second deployment mode; and transmit the wakeup signal.

In some aspects, the method performed by the UE may include receiving a wakeup signal in a guardband mode or a standalone mode (GB/SA mode), wherein the wakeup signal is based at least in part on a first base sequence associated with a first deployment mode, and the first base sequence includes more symbols than a second base sequence associated with a second deployment mode; and performing a wakeup based at least in part on the wakeup signal.

In some aspects, the UE may include a memory and one or more processors operatively coupled to the memory. The memory and the one or more processors may be configured to receive a wakeup signal in a guardband mode or a standalone mode (GB/SA mode), wherein the wakeup signal is based at least in part on a first base sequence associated with a first deployment mode, and the first base sequence includes more symbols than a second base sequence associated with a second deployment mode; and perform a wakeup based at least in part on the wakeup signal.

In some aspects, the apparatus may include means for receiving a wakeup signal in a guardband mode or a standalone mode (GB/SA mode), wherein the wakeup signal is based at least in part on a first base sequence associated with a first deployment mode, and the first base sequence includes more symbols than a second base sequence associated with a second deployment mode; and means for performing a wakeup based at least in part on the wakeup signal.

In some aspects, the computer program product may include a non-transitory computer-readable medium storing one or more instructions that, when executed by one or more processors of a UE, may cause the one or more processors to receive a wakeup signal in a guardband mode or a standalone mode (GB/SA mode), wherein the wakeup signal is based at least in part on a first base sequence associated with a first deployment mode, and the first base sequence includes more symbols than a second base sequence associated with a second deployment mode; and perform a wakeup based at least in part on the wakeup signal.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
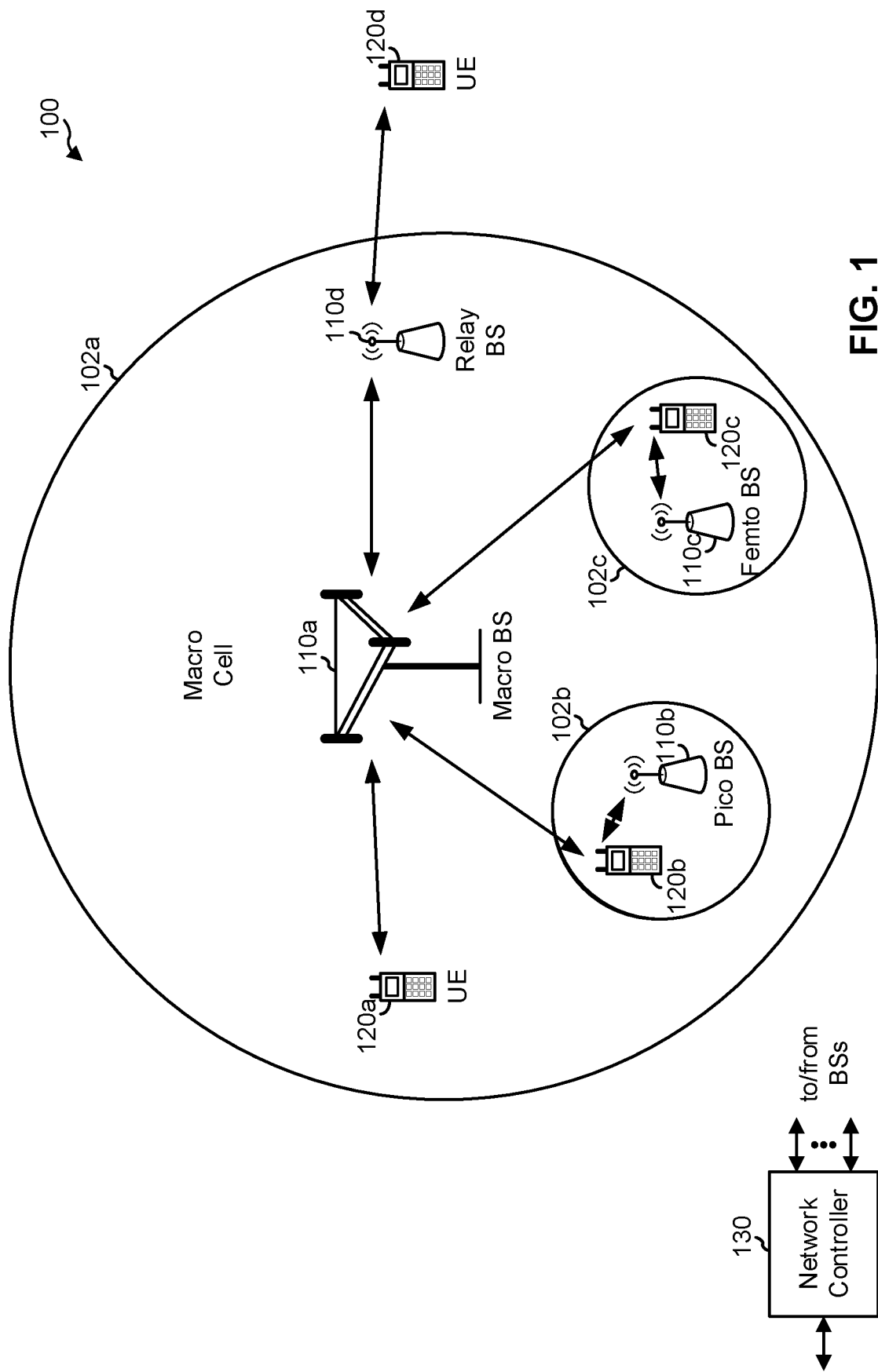
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. In some aspects, NB-IoT and/or eMTC UEs may remain in a dormant or idle state until awakened by a wakeup signal to receive a communication, as described elsewhere herein.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
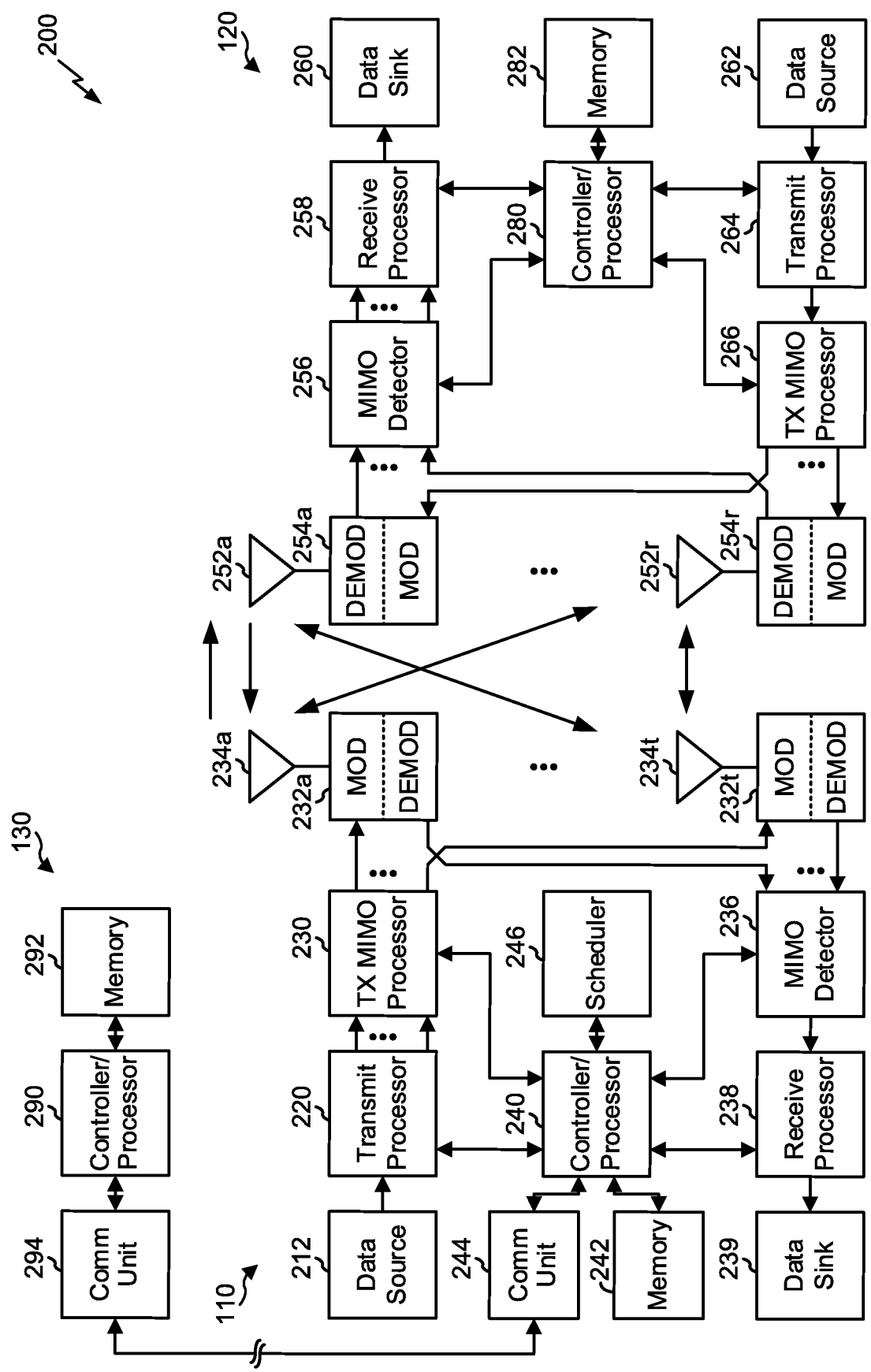
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS), secondary synchronization signal (SSS), narrowband PSS (NPSS), narrowband SSS (NSSS), and/or the like). Transmit processor 220 may also generate wakeup signals for subsequent communications. A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform wakeup signal generation and transmission in 5G. For example, controller/processor 240 of BS 110, controller/processor 280 of UE 120, and/or any other component(s) of FIG. 2 may perform or direct operations of, for example, method 400 of FIG. 4, method 500 of FIG. 5, method 1100 of FIG. 11, method 1400 of FIG. 14 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Wakeup Signal Generation

Figure 3:
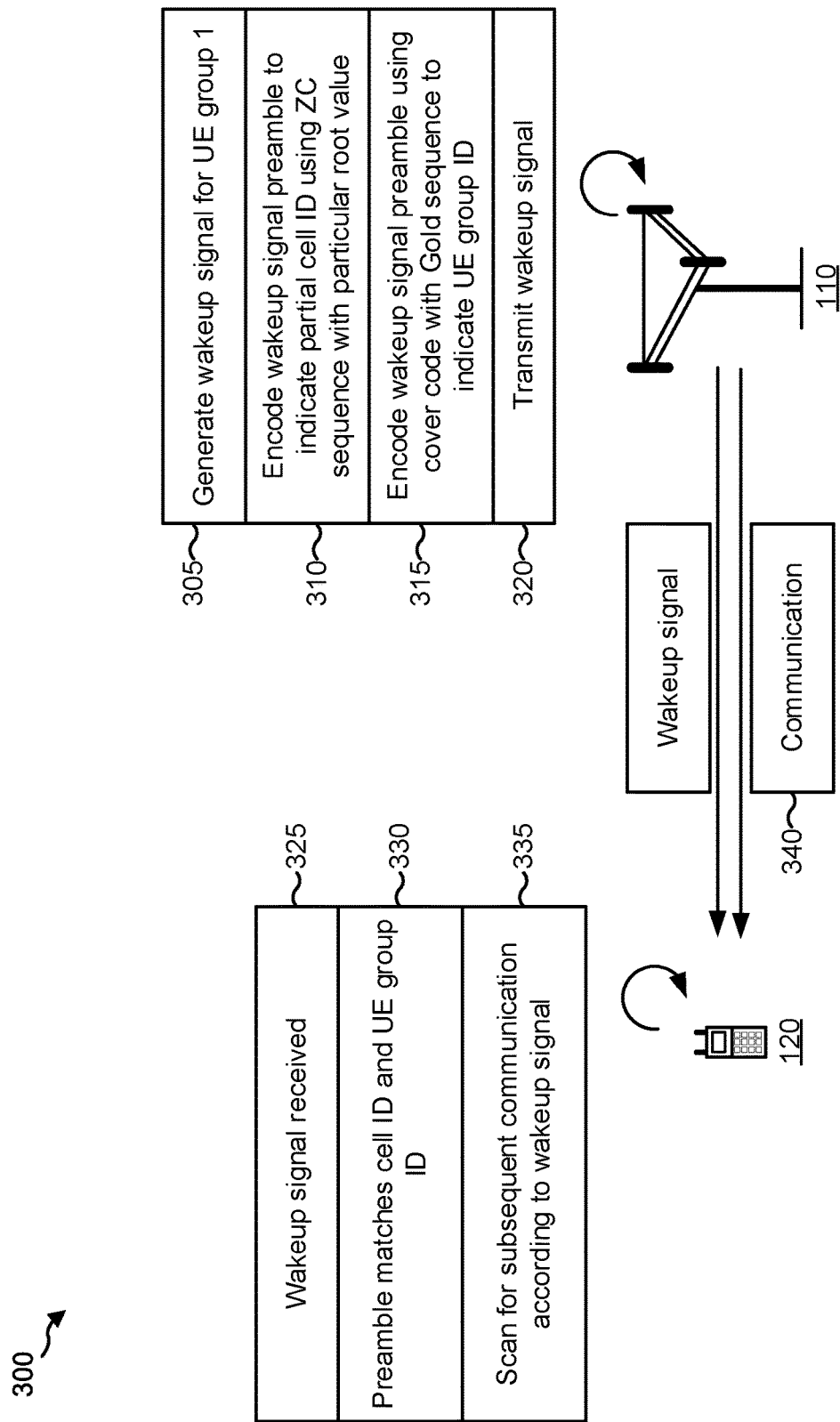
FIG. 3 is a diagram illustrating an example of generation and transmission of a wakeup signal for a UE group.

FIG. 3 is a diagram illustrating an example 300 of generation and transmission of a wakeup signal for a UE group.

As shown by reference number 305, a BS 110 may generate a wakeup signal for a UE group shown as UE group 1. In some aspects, the UE group may be associated with a UE group identifier (e.g., 1, 123456, ABCD, 19D76, and/or the like). The UE group may include one or more UEs. For the purpose of FIG. 3, assume that UE 120 is included in the UE group. The BS 110 may generate the wakeup signal so that the UE 120 can determine that the wakeup signal is associated with the UE 120 and/or the UE group 1, as described in more detail below. For example, a preamble of the wakeup signal may identify the UE group 1 and/or a cell identity of a cell provided by the BS 110.

As shown by reference number 310, the BS 110 may encode the preamble of the wakeup signal to indicate at least a portion of a cell identifier. For example, the BS 110 may use a Zadoff-Chu (ZC) sequence with a particular root to indicate the cell identifier. In some aspects, the BS 110 may use a ZC sequence with a particular root to indicate a UE group identifier.

In some aspects, the preamble may extend across multiple symbols. In such a case, the ZC sequence may be a 131-length ZC sequence, which may be mapped to 131 resource elements in 11 symbols of a physical resource block (PRB). In some aspects, the ZC sequence may use a same root as a synchronization signal. For example, the ZC sequence may use a same root as a narrowband secondary synchronization signal (NSSS), which may reduce time associated with retuning to detect the wakeup signal and/or preamble. As a more particular example, the wakeup signal is a ZC sequence with cyclic shift, further scrambled by a cover code, which may be determined based at least in part on the following:

$$d(n) = b(m)e^{-j2\pi\theta_f n}e^{-j\frac{\pi u n'(n'+1)}{131}}$$
$$n = 0, 1, \ldots, 131; n' = n \bmod 131; m = n \bmod 127$$
$$u = N_{ID}^{cell} \bmod 126 + 3$$

wherein d(n) is a sequence for a wakeup signal based on the 131-length ZC sequence n is an integer (e.g., in a range of 0 to 130), b(m) is a cover code or scrambling code, m is an integer (e.g., in a range of 0 to 126), j is a complex reflection coefficient, $\theta_f$ is a phase shift, and $N_{ID}^{cell}$ is a cell identifier.

In some aspects, the cyclic shift may indicate at least a portion of the UE group identifier and/or at least a portion of the cell identity based at least in part on a cyclic shift. For example, the UE 120 may determine the cyclic shift using $$\theta_f = \frac{32}{132}(N_{ID}^{UEgroup} \bmod 4).$$

As shown by reference number 315, the BS 110 may encode a cover code to the preamble to indicate at least a portion of the UE group identifier and/or at least a portion of the cell identifier. When the preamble extends across multiple symbols, a resource-element level cover code may be determined using a Gold sequence of a particular length (e.g., a length of 127 and/or the like). More particularly, the cover code b(m) may be determined based at least in part on the following equations and values:

$$b(m) = [1 - 2x_0((m + m_0) \bmod 127)][1 - 2x_1((m + m_1) \bmod 127)]$$

$$m_0 = \left\lfloor \frac{N_{ID}^{cell}}{126} \right\rfloor, m_1 = \left\lfloor \frac{N_{ID}^{UE\ group}}{4} \right\rfloor \bmod 126, 0 \le m < 127$$

$$x_0(i + 7) = (x_0(i + 4) + x_0(i)) \bmod 2 \text{ with}$$

$$x_1(i + 7) = (x_1(i + 1) + x_1(i)) \bmod 2 \text{ initialized by}$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1].$$

If there is no UE group ID, the cover codes may be simplified as a on m-sequence, such as:

$$b(m) = [1 - 2x_0((m + m_0) \bmod 127)]$$

$$m_0 = \left\lfloor \frac{N_{ID}^{cell}}{126} \right\rfloor, 0 \le m < 127 \text{ with}$$

$$x_0(i + 7) = (x_0(i + 4) + x_0(i)) \bmod 2$$

initialized by $[x_0(6)\ x_0(5)\ x_0(4)\ x_0(3)\ x_0(2)\ x_0(1)\ x_0(0)] = [0\ 0\ 0\ 0\ 0\ 0\ 1]$.

In some aspects, the wakeup signal maybe composed of a sequence that is repeated over multiple resource blocks within a narrowband.

In some aspects, the cover code may be based at least in part on a system frame number (SFN) of the BS 110. For example, the cover code may be based at least in part on an SFN-related index. This may enable the UE to identify the wakeup signal based at least in part on the NPSS and/or NSSS without having to detect or decode the physical broadcast channel (PBCH) prior to wakeup signal detection. In such a case, $m_1$ in the above equation may be given by $$m_1 \left( \left\lfloor \frac{n_f}{8} \right\rfloor \mod 8 \right)$$

if $N^{UE\ group} \leq 4$; otherwise if $4 < N^{UE\ group} \leq 8$, $$m_1 = \left( \left( \left\lfloor \frac{N_{ID}^{UE\ group}}{4} \right\rfloor \mod 2 \right) + 2 \left( \left\lfloor \frac{n_f}{8} \right\rfloor \mod 4 \right) \right),$$

wherein $n_f$ is an SFN, $N^{UE\ group}$ is the total number of UE groups configured by the network with $1 \leq N^{UE\ group} \leq 8$, and $N_{ID}^{UE\ group}$ is a UE group identifier and $N_{ID}^{UE\ group} = 0, \ldots, (N^{UE\ group} - 1)$. Note that in the above equation of $m_1$, $n_f$ can be set as the SFN of the wakeup signal starting subframe. In the time-domain, the same wakeup signal sequence is repeated over subframes so that UEs use same local wakeup signal sequence for correlation per subframe with less searching complexity, rather than changing the different sequences if the SFN changes during the wakeup signal duration. On top of each wakeup signal subframe-level repetition, a cell-specific binary scrambling code can be applied to help interference randomization. Similarly, in the case of eMTC with max 6PRB bandwidth, if the wakeup signal sequence of 1 PRB is repeated over multiple PRBs in the frequency domain, a cell-specific binary PRB-level scrambling code multiplexed with the wakeup signal sequence can help peak-to-average power ratio (PAPR) reduction. Other interference randomization schemes are also possible for eMTC instead of frequency-domain PRB repetitions with scrambling, such as mapping the wakeup signal sequence on one PRB within 6 PRB bandwidth with power boosting and changing the frequency PRB location of the wakeup signal sequence.

In some aspects, the wakeup signal is a ZC sequence with no cyclic shift, scrambled by a cover code, which may be determined based at least in part on the following:

$$d(n) = b(m) e^{-j\frac{\pi u n'(n'+1)}{131}}$$

$n = 0, 1, \ldots, 131; n' = n \mod 131; m = n \mod 127$ $u = N_{ID}^{cell} \mod 126 + 3$ Here, using no cyclic shift on the ZC sequence is more robust against the timing drift. As shown by reference number 315, the BS 110 may encode a cover code of the preamble to indicate at least a portion of the UE group identifier and/or at least a portion of the cell identifier. When the preamble extends across multiple symbols, a resource-element level cover code may be determined using a Gold sequence of a particular length (e.g., a length of 127 and/or the like). More particularly, the cover code b(m) may be determined based at least in part on the following equations and values:

$$b(m) = [1 - 2x_0((m + m_0) \mod 127)][1 - 2x_1((m + m_1) \mod 127)]$$

$$m_0 = \left\lfloor \frac{N_{ID}^{cell}}{126} \right\rfloor, m_1 = N_{ID}^{UE\ group} \mod 126, 0 \leq m < 127$$

with
$x_0(i+7) = (x_0(i+4) + x_0(i)) \mod 2$
$x_1(i+7) = (x_1(i+1) + x_1(i)) \mod 2$,
initialized by
$[x_0(6)\ x_0(5)\ x_0(4)\ x_0(3)\ x_0(2)\ x_0(1)\ x_0(0)] = [0\ 0\ 0\ 0\ 0\ 0\ 1]$
$[x_1(6)\ x_1(5)\ x_1(4)\ x_1(3)\ x_1(2)\ x_1(1)\ x_1(0)] = [0\ 0\ 0\ 0\ 0\ 0\ 1]$.

In some aspects, the cover code may be based at least in part on a system frame number (SFN) of the BS 110. For example, the cover code may be based at least in part on an SFN-related index. This may enable the UE to identify the wakeup signal based at least in part on the NPSS and/or NSSS without having to detect or decode the PBCH prior to wakeup signal detection. In such a case, $m_1$ in the above equation may be given by $$m_1 = \left( \left( N_{ID}^{UE\ group} \mod N^{UE\ group} \right) + N^{UE\ group} \left( \left\lfloor \frac{n_f}{8} \right\rfloor \mod \left( \frac{8}{N^{UE\ group}} \right) \right) \right),$$

wherein $n_f$ is an SFN, $N^{UE\ group}$ is the total number of UE groups configured by the network with $1 \leq N^{UE\ group} \leq 8$, and $N_{ID}^{UE\ group}$ is a UE group identifier and $N_{ID}^{UE\ group} = 0, \ldots, (N^{UE\ group} - 1)$. Note that in the above equation of $m_1$, $n_f$ can be set as the SFN of the wakeup signal starting subframe. In the time-domain, the same wakeup signal sequence is repeated over subframes so that UEs use same local wakeup signal sequence for correlation per subframe with less searching complexity, rather than changing the different sequences if the SFN changes during the wakeup signal duration. In addition to each wakeup signal subframe-level repetition, a cell-specific binary scrambling code can be applied to help interference randomization. Similarly, in case of eMTC with up to 6 PRB bandwidth, if the wakeup signal sequence of 1 PRB is repeated over multiple PRBs in the frequency domain, a cell-specific binary PRB-level scrambling code multiplexed with wakeup signal sequence can help PAPR reduction. Other interference randomization scheme is also possible for eMTC instead of frequency-domain PRB repetitions with scrambling, such as mapping the wakeup signal sequence on one PRB within 6 PRB bandwidth with power boosting but changing the frequency PRB location of the wakeup signal sequence.

In some aspects, the preamble may be based at least in part on a sequence with single symbol in length, and may be extended to multiple symbols. For example, multiple short one-symbol preambles may be concatenated and/or repeated for two or more symbols. The repeated symbols may be scrambled by a cover code. In such a case, a ZC sequence may have an 11-symbol length, which may be similar to a ZC sequence of a synchronization signal (e.g., a narrowband primary synchronization signal (NPSS), thereby enabling time-domain auto-correlation and cross-correlation. Additionally, or alternatively, such a ZC sequence may use a different root than the NPSS, which may avoid the confusion between the wakeup signal and the NPSS. For example, the root may be selected from possible values of 2, 3, 4, 6, 7, 8, 9, 10, in which 5 is omitted because a root of 5 is used for the NPSS. In such a case, the UE 120 may select the root based at least in part on an index value q, which may be selected as $q=N_{ID}^{UE\ group}$ mod 8. In this case, $N_{ID}^{UE\ group}$ is a UE group identifier of the UE 120 (e.g., the UE group 1). Therefore, as a more particular example, the wakeup signal is a ZC sequence, further scrambled by a cover code, which may be determined based at least in part on the following:

$$d(k, n) = b(m)e^{-j\frac{\pi u_q n'(n'+1)}{11}}$$

$$n = 0, 1, \ldots, 10; n' = n \bmod 11; m = k - 3; k = 3, \ldots, 13;$$

$$u_q = 2, 3, 4, 6, 7, 8, 9, \text{ or } 10, \text{ with } q = N_{ID}^{UE\ group} \bmod 8$$

wherein d(k,n) is a sequence for a wakeup signal based on the 11-length ZC sequence mapping on the k-th symbol, k is the symbol index (e.g., k=3 . . . 13) within a 14-symbol subframe, and n is an integer (e.g., in a range of 0 to 10), b(m) is a cover code or scrambling code, m is an integer (e.g., in a range of 0 to 10), and j is a complex reflection coefficient.

In some aspects, when the cover code at a per-symbol level, a symbol-level cover code may be used with an 11-length sequence, so that respective elements of the cover code are applied to 11 symbols. For example, a truncated m sequence may be used. More particularly, the truncated m sequence may be determined according to $m_0 = N_{ID}^{cell}$ mod 11. Furthermore, in such a case, the cover code may be determined using the following equations and values:

$$b(n) = [1 - 2x_0((n+m_0) \bmod 15)], 0 \le n < 11$$

with $$x_0(i+4) = (x_0(i+1) + x_0(i)) \bmod 2,$$

initialized by
$[x_0(3)\ x_0(2)\ x_0(1)\ x_0(0)] = [0\ 0\ 0\ 1]$.

Additionally, or alternatively, a resource-element level cover code may be used. In such a case, the cover code may have a length of 121. As a more particular example, the wakeup signal is a ZC sequence scrambled by such a resource-element level cover code, which may be determined based at least in part on the following:

$$d(k, n) = b(m)e^{-j\frac{\pi u_q n'(n'+1)}{11}}$$

$$n = 0, 1, \ldots, 10; n' = n \bmod 11; m = 11(k - 3) + n;$$

$$k = 3, \ldots, 13;$$

$$u_q = 2, 3, 4, 6, 7, 8, 9, \text{ or } 10, \text{ with } q = N_{ID}^{UE\ group} \bmod 8$$

wherein d(k,n) is a sequence for a wakeup signal based on the 11-length ZC sequence mapping on the k-th symbol, k is the symbol index (e.g., k=3 . . . 13) within a 14-symbol subframe, and n is an integer (e.g., in a range of 0 to 10), b(m) is a cover code or scrambling code, m is an integer (e.g., in a range of 0 to 120), j is a complex reflection coefficient.

For example, the cover code may be determined using a truncated Gold sequence, such as a 127-length Gold sequence. More particularly, the cover code may be determined using the following equations:

$$b(m) = [1 - 2x_0((m+m_0) \bmod 127)][1 - 2x_1((m+m_1) \bmod 127)]$$

$$m_0 = \left\lfloor \frac{N_{Cell\_ID}}{126} \right\rfloor, m_1 = N_{ID}^{cell} \bmod 126, 0 \le m < 121 \text{ with}$$

$$x_0(i+7) = (x_0(i+4) + x_0(i)) \bmod 2$$

$$x_1(i+7) = (x_1(i+1) + x_1(i)) \bmod 2,$$

initialized by
$[x_0(6)\ x_0(5)\ x_0(4)\ x_0(3)\ x_0(2)\ x_0(1)\ x_0(0)] = [0\ 0\ 0\ 0\ 0\ 0\ 1]$
$[x_1(6)\ x_1(5)\ x_1(4)\ x_1(3)\ x_1(2)\ x_1(1)\ x_1(0)] = [0\ 0\ 0\ 0\ 0\ 0\ 1]$ In this way, a cover code is determined on a per-symbol basis or a per-resource element basis to indicate a cell and/or UE group associated with a wakeup signal to which the cover code is applied.

In some aspects, the multiple short one-symbol preambles may be concatenated using a combination of different roots for two or more symbols to extend the capacity of the preambles. The root may be selected from possible values of 2, 3, 4, 6, 7, 8, 9, 10, in which 5 is omitted because a root of 5 is used for the NPSS. For example, the roots for 11-symbol preamble may be selected as using different root combinations, such as all 11 symbols using the same root u, or part of 11 symbols using root u1 but the remaining part of the 11 symbols using the conjugate root as u2. If u1+u2=11, the roots may be conjugate root pairs. Note that the conjugate root pairs of the ZC sequences can be detected in parallel to reduce the receiver complexity. The Table below illustrates the root combinations with index c to generate a concatenated/repeated one-symbol preambles. In such a case, the UE 120 may select one of the root combination such as $c=N_{ID}^{UE\ group}$ mod 16 so that a larger UE group identifier can be differentiated by the preamble.

| Root combinations | Symbol 0 | Symbol 1 | Symbol 2 | Symbol 3 | Symbol 4 | Symbol 5 | Symbol 6 | Symbol 7 | Symbol 8 | Symbol 9 | Symbol 10 |
|---|---|---|---|---|---|---|---|---|---|---|---|
| #0 | 2 | 2 | 2 | 2 | 2 | 2 | 2 | 2 | 2 | 2 | 2 |
| #1 | 3 | 3 | 3 | 3 | 3 | 3 | 3 | 3 | 3 | 3 | 3 |
| #2 | 4 | 4 | 4 | 4 | 4 | 4 | 4 | 4 | 4 | 4 | 4 |
| #3 | 6 | 6 | 6 | 6 | 6 | 6 | 6 | 6 | 6 | 6 | 6 |
| #4 | 7 | 7 | 7 | 7 | 7 | 7 | 7 | 7 | 7 | 7 | 7 |
| #5 | 8 | 8 | 8 | 8 | 8 | 8 | 8 | 8 | 8 | 8 | 8 |
| #6 | 9 | 9 | 9 | 9 | 9 | 9 | 9 | 9 | 9 | 9 | 9 |
| #7 | 10 | 10 | 10 | 10 | 10 | 10 | 10 | 10 | 10 | 10 | 10 |
| #8 | 2 | 2 | 2 | 2 | 2 | 2 | 9 | 9 | 9 | 9 | 9 |
| #9 | 9 | 9 | 9 | 9 | 9 | 9 | 2 | 2 | 2 | 2 | 2 |
| #10 | 3 | 3 | 3 | 3 | 3 | 3 | 8 | 8 | 8 | 8 | 8 |
| #11 | 8 | 8 | 8 | 8 | 8 | 8 | 3 | 3 | 3 | 3 | 3 |
| #12 | 4 | 4 | 4 | 4 | 4 | 4 | 7 | 7 | 7 | 7 | 7 |

-continued

| Root combinations | Symbol 0 | Symbol 1 | Symbol 2 | Symbol 3 | Symbol 4 | Symbol 5 | Symbol 6 | Symbol 7 | Symbol 8 | Symbol 9 | Symbol 10 |
|---|---|---|---|---|---|---|---|---|---|---|---|
| #13 | 7 | 7 | 7 | 7 | 7 | 7 | 4 | 4 | 4 | 4 | 4 |
| #14 | 6 | 6 | 6 | 6 | 6 | 6 | 10 | 10 | 10 | 10 | 10 |
| #15 | 10 | 10 | 10 | 10 | 10 | 10 | 6 | 6 | 6 | 6 | 6 |

In some aspects, the wakeup signal may be mapped to particular resources. For example, a wakeup signal that occupies 1 physical resource block (PRB) may occupy a set of continuous symbols (e.g., symbols 3 through 13) within a bandwidth of 180 kHz (e.g., corresponding to 12 subcarriers of 15 kHz). Additionally, or alternatively, the wakeup signal may puncture one or more signals of the PRB. For example, the wakeup signal may puncture resource elements reserved for a cell-specific reference signal (CRS), a narrowband reference signal (NRS), and/or the like. More particularly, the wakeup signal may puncture REs for the CRS on all antenna ports, may puncture the REs for the NRS on a first antenna port (e.g., antenna port 0), and may puncture the REs for the NRS on a second antenna port (e.g., antenna port 1). In some aspects, the wakeup signal may puncture the REs in a particular case, such as for inband NB-IoT. In the case when the 11-length ZC sequence is used (e.g., for per-symbol mapping), the ZC sequence may be mapped on 11 subcarriers of the PRB, and a 12th subcarrier, such as a subcarrier associated with a particular index, may not be used.

As shown by reference number 320, the BS 110 may transmit the wakeup signal. In some aspects, the BS 110 may transmit the wakeup signal in particular resources and/or using particular antenna ports, as described in more detail above.

As shown by reference number 325, the UE 120 may receive the wakeup signal. In some aspects, the UE 120 may receive the wakeup signal based at least in part on a technique selected by the UE 120. For example, the UE 120 may use a first technique wherein the UE 120 receives the wakeup signal without performing synchronization using a legacy synchronization signal, such as an NPSS, an NSSS, a CRS, an NRS, a primary synchronization signal (PSS), a secondary synchronization signal (SSS), and/or the like. In some aspects, the UE 120 may perform synchronization using the wakeup signal, which may require a timing and/or frequency drift estimation based at least in part on autocorrelation and/or cross-correlation of the wakeup signal.

In some aspects, the UE 120 may use a second technique wherein a partial synchronization is performed. In this case, the UE 120 may use a PSS or NPSS to determine a raw timing and/or frequency drift correction before detecting the wakeup signal. In this way, the UE 120 can detect the wakeup signal with reduced timing and/or frequency error by using the PSS or NPSS to perform partial synchronization.

In some aspects, the UE 120 may use a third technique wherein a full synchronization is performed before the wakeup signal is detected. In this case, the UE 120 may use legacy synchronization signals for a fine timing and/or frequency correction. Additionally, or alternatively, the UE 120 may use the legacy synchronization signal to determine a phase reference, for example, when the legacy synchronization signal is transmitted using a same port as the wakeup signal.

The UE 120 may select a technique from the first technique, the second technique, and the third technique based at least in part on parameters and/or operating conditions of the UE 120. For example, the parameters and/or operating conditions may include a discontinuous reception (DRX) cycle configuration of the UE, an extended DRX (eDRX) cycle of the UE 120, a probability of encountering a paging occasion, a frequency error or frequency drift of a local oscillator or real-time clock of the UE, and/or the like. In this way, the UE 120 may determine a technique based at least in part on resource availability and/or operating conditions of the UE 120, which improves efficiency of the wakeup signaling process and reduces waste associated with performing a partial or full synchronization when a partial or full synchronization is not needed.

As shown by reference number 330, the UE 120 may determine that the preamble of the wakeup signal matches a cell identity and a UE group identifier associated with the UE 120. For example, the BS 110 may configure the UE 120 with information identifying the cell identity and/or the UE group identifier. Additionally, or alternatively, the UE 120 may determine the UE group identifier (e.g., based at least in part on a UE identifier of the UE 120 and/or the like).

As shown by reference number 335, the UE 120 may monitor for a subsequent communication according to the wakeup signal. For example, the UE 120 may exit a dormant or idle state, and may scan for paging and/or a grant associated with a downlink communication. As shown by reference number 340, the UE 120 may receive the communication. In some aspects, the UE 120 may wake up or perform a wakeup based at least in part on the wakeup signal. As used herein, waking up or performing a wakeup may refer to monitoring or beginning to monitor for paging at paging occasions. For example, when waking up or performing a wakeup, the UE may monitor or begin to monitor for a control channel (e.g., a PDCCH such as an MTC PDCCH or a narrowband PDCCH, etc.), a data channel (e.g., a PDSCH such as an MTC PDSCH or a narrowband PDSCH, etc.), and/or a different type of paging.

In this way, a wakeup signal is encoded using a cover code, a ZC sequence, and/or a cyclic shift to convey information, identifying a UE group identifier and/or cell identity of the wakeup signal, to a UE 120. By using the cover code, ZC sequence, and/or cyclic shift, compatibility with legacy implementations is improved. Furthermore, the UE group identifier and/or cell identity can be provided to the UE 120 without significantly increasing a size of the wakeup signal, which further improves compatibility with legacy implementations and conserves radio resources.

As indicated above, FIG. 3 is provided as an example. Other examples are possible and may differ from what was described with respect to FIG. 3.

Figure 4:
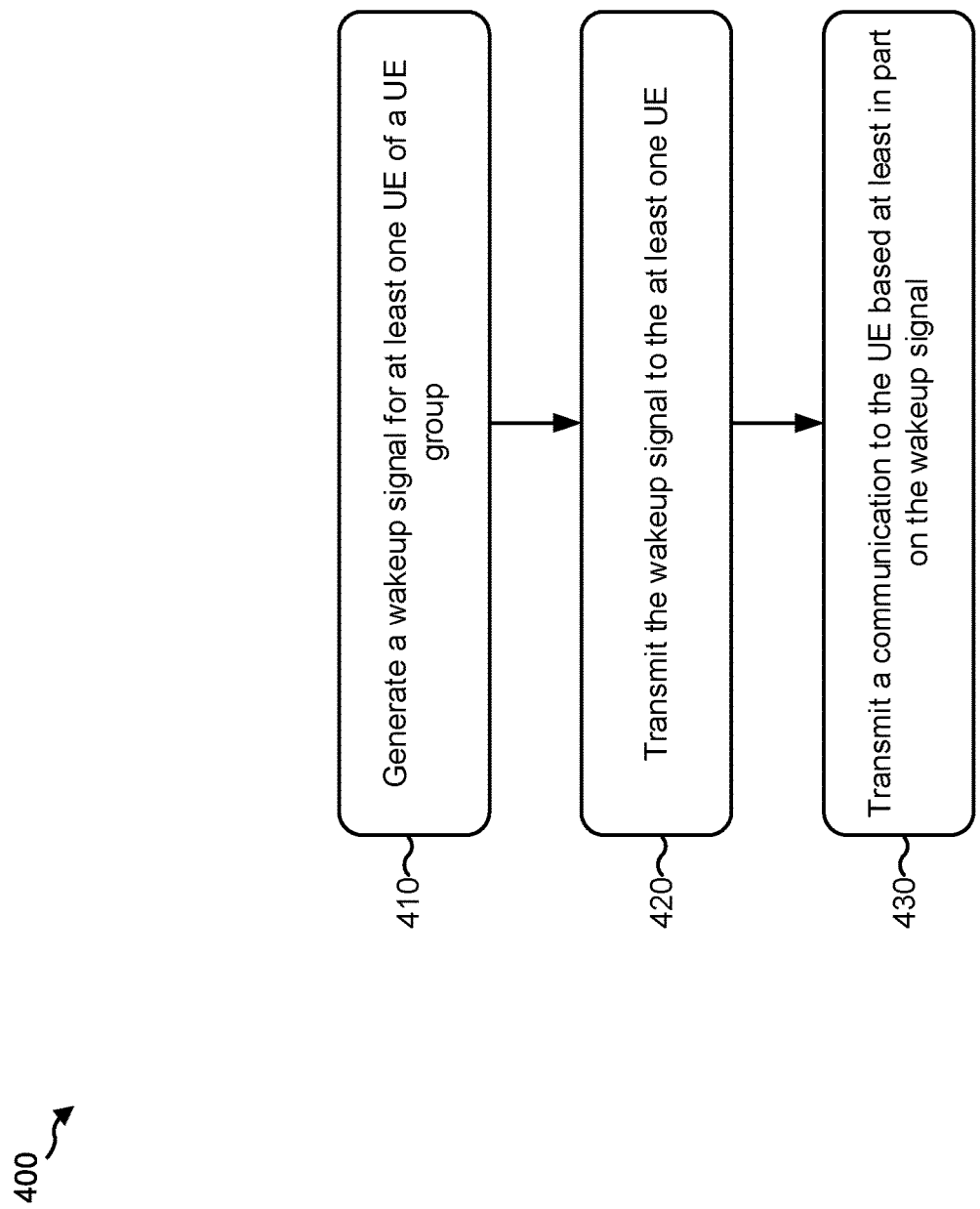
FIG. 4 is a flow chart of a method of wireless communication.

FIG. 4 is a flow chart of a method 400 of wireless communication. The method may be performed by a base station (e.g., the BS 110 of FIG. 1, the apparatus 602/602', and/or the like).

At 410, the base station may generate a wakeup signal for at least one UE (e.g., the UE 120, the apparatus 802/802', and/or the like) of a UE group. For example, the BS 110 may encode a preamble of the wakeup signal to identify at least one of a portion of a UE group identifier of the wakeup signal or a portion of a cell identity of the wakeup signal. In some aspects, the preamble may span across multiple, different symbols. In some aspects, the preamble may be determined and/or applied on a per-symbol basis. In some aspects, the wakeup signal is composed of a sequence that is repeated over multiple resource blocks within a narrowband.

In some aspects, the portion of the UE group identifier includes an entirety of the UE group identifier, and/or wherein the portion of the cell identity includes an entirety of the cell identity. In some aspects, the preamble is encoded using a sequence with a length corresponding to two or more symbols. In some aspects, a cyclic shift of the preamble identifies the portion of the UE group identifier.

In some aspects, the preamble is generated using a Zadoff-Chu sequence that is configured to identify the portion of UE group identifier and/or the portion of the cell identity. For example, the Zadoff-Chu sequence may use a root other than a root associated with a synchronization signal. In some aspects, the Zadoff-Chu sequence uses a same root as a synchronization signal. Additionally, or alternatively, the Zadoff-Chu sequence may be mapped to a plurality of subcarriers of a resource block, and the Zadoff-Chu sequence may not be mapped to a subcarrier associated with a particular index.

In some aspects, a cyclic shift of the preamble identifies the portion of the UE group identifier and/or the portion of the cell identity. In some aspects, a cover code of the preamble identifies the portion of the UE group identifier and/or the portion of the cell identity. The cover code may be configured based at least in part on a length corresponding to a number of symbols of the preamble, and each element of the cover code may be applied to a single symbol. In some aspects, the cover code is based at least in part on a system frame number of the base station.

In some aspects, the preamble is one of a plurality of preambles that are encoded using a sequence with a length that corresponds to a single symbol, and wherein the plurality of preambles is concatenated into two or more symbols. In some aspects, the cell identity corresponds to a camped cell or connected cell of the UE group.

At 420, the base station may transmit the wakeup signal to the at least one UE. For example, the base station may broadcast the wakeup signal in particular resources, which may be allocated as described elsewhere herein. The at least one UE may identify the wakeup signal based at least in part on the preamble. For example, the at least one UE may determine whether a cell identity and/or UE group identifier of the preamble is associated with the at least one UE. In some aspects, the wakeup signal punctures one or more resources allocated for at least one reference signal.

At 430, the base station may transmit a communication to the UE based at least in part on the wakeup signal. For example, the base station may transmit the communication immediately or after a delay that is known to the base station and/or the UE. In this way, the base station configures the UE to wake up for the communication, which enables the UE to remain in a low power state wherein the UE does not check paging or grants. Thus, battery life of the UE is improved.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
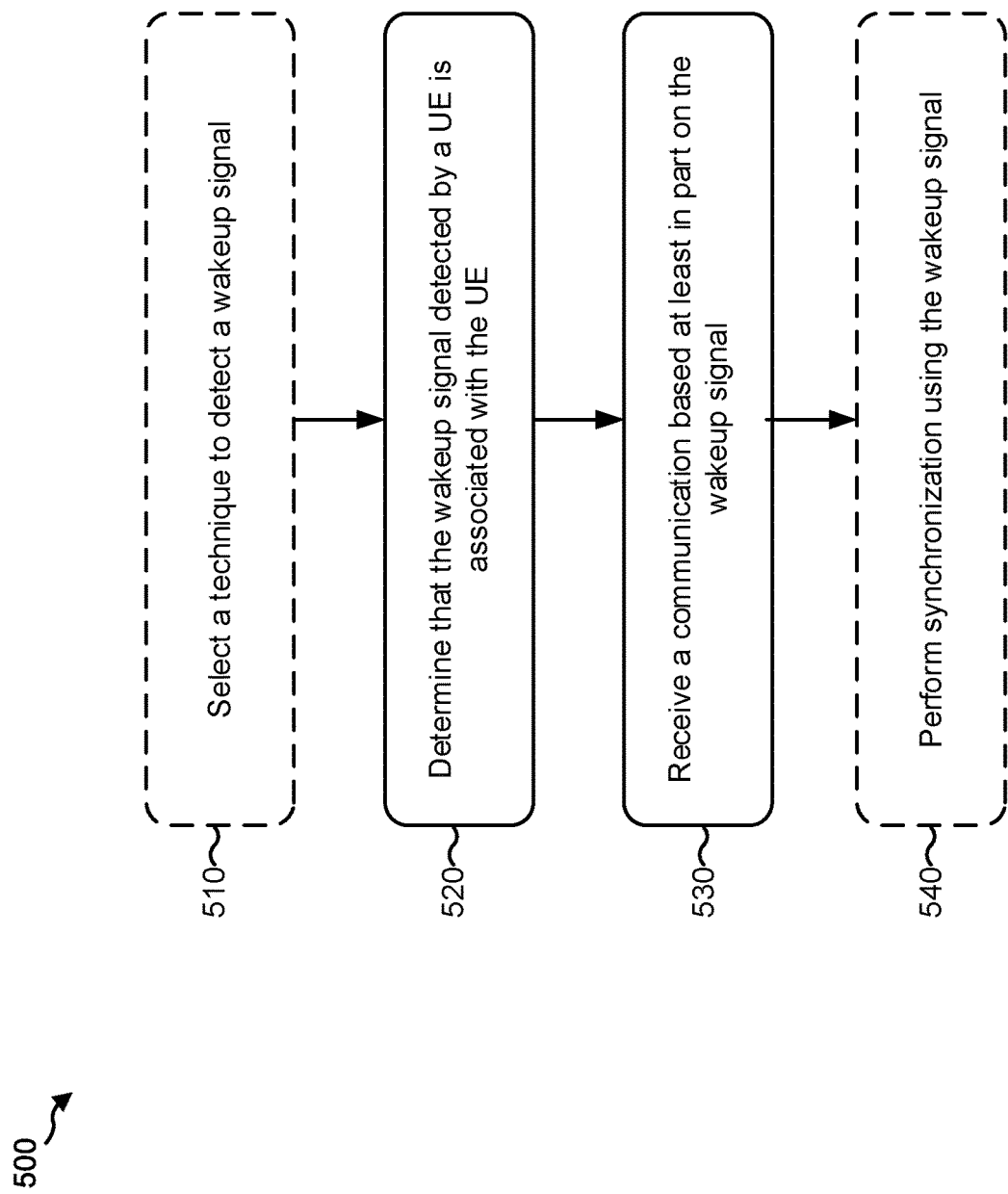
FIG. 5 is a flow chart of a method of wireless communication.

FIG. 5 is a flow chart of a method 500 of wireless communication. The method may be performed by a UE (e.g., the UE 120 of FIG. 1, the apparatus 802/802', and/or the like).

At 510, the UE may optionally select a technique to detect a wakeup signal. For example, the UE may select a first synchronization technique, a second synchronization technique, or a third synchronization technique. In the first synchronization technique, no synchronization of the UE is performed. In the second synchronization technique, a partial synchronization of the UE is performed. For example, the wakeup signal may be detected after a partial synchronization of the UE using a synchronization signal. In some aspects, the wakeup signal is detected based at least in part on a system frame number (SFN), and the SFN is indicated by the preamble of the wakeup signal. In the third synchronization technique, a full synchronization of the UE is performed. For example, the wakeup signal may be detected after a full synchronization of the UE using one or more synchronization signals. The UE may select the technique based at least in part on an operating condition or parameter of the UE.

At 520, the UE may determine that the wakeup signal detected by the UE is associated with the UE. For example, the UE may determine that the wakeup signal is associated with the UE based at least in part on a UE group identifier and/or cell identity of the wakeup signal, as described in more detail elsewhere herein.

At 530, the UE may receive a communication based at least in part on the wakeup signal. For example, the UE may receive the communication immediately after detecting the wakeup signal or after a particular delay after detecting the wakeup signal. The UE may wake up or exit an idle or dormant state to receive the communication.

At 540, the UE may optionally perform synchronization using the wakeup signal. For example, the UE may determine a reference value, a timing and/or frequency drift estimation, and/or the like. In this way, the UE may reduce reliance on legacy synchronization signals, which improves spectral efficiency.

Although FIG. 5 shows example blocks of a method of wireless communication, in some aspects, the method may include additional blocks, fewer blocks, different blocks, or differently arranged blocks than those shown in FIG. 5. Additionally, or alternatively, two or more blocks shown in FIG. 5 may be performed in parallel.

Figure 6:
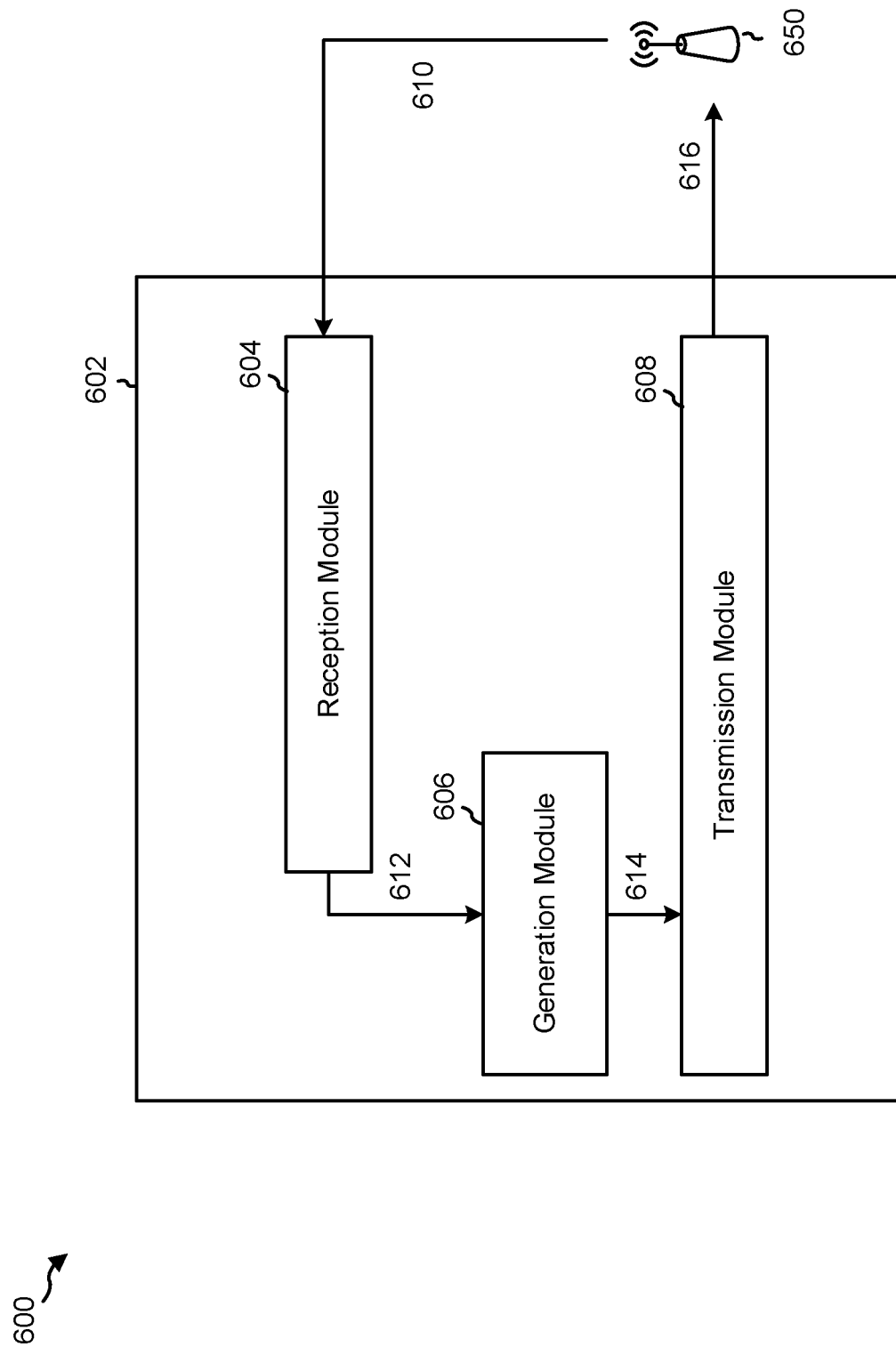
FIG. 6 is a conceptual data flow diagram illustrating the data flow between different modules/means/components in an example apparatus.

FIG. 6 is a conceptual data flow diagram 600 illustrating the data flow between different modules/means/components in an example apparatus 602. The apparatus 602 may be base station, such as an eNB, a gNB, and/or the like. In some aspects, the apparatus 602 includes a reception module 604, a generation module 606, and/or a transmission module 608.

The reception module 604 may receive data 610 from a UE 650 (e.g., the UE 120 and/or the like). In some aspects, the data 610 may indicate a UE group identifier of the UE, and/or the like. The reception module 604 may provide the data 610 as data 612 to the generation module 606. The generation module 606 may generate a wakeup signal for at least one UE 650 of a UE group. The generation module may provide the wakeup signal to the transmission module 608 as data 614. The transmission module 608 may transmit the wakeup signal to the UE 650 as signals 616.

The apparatus may include additional modules that perform each of the blocks of the algorithm in the aforementioned flow chart of FIG. 4. As such, each block in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
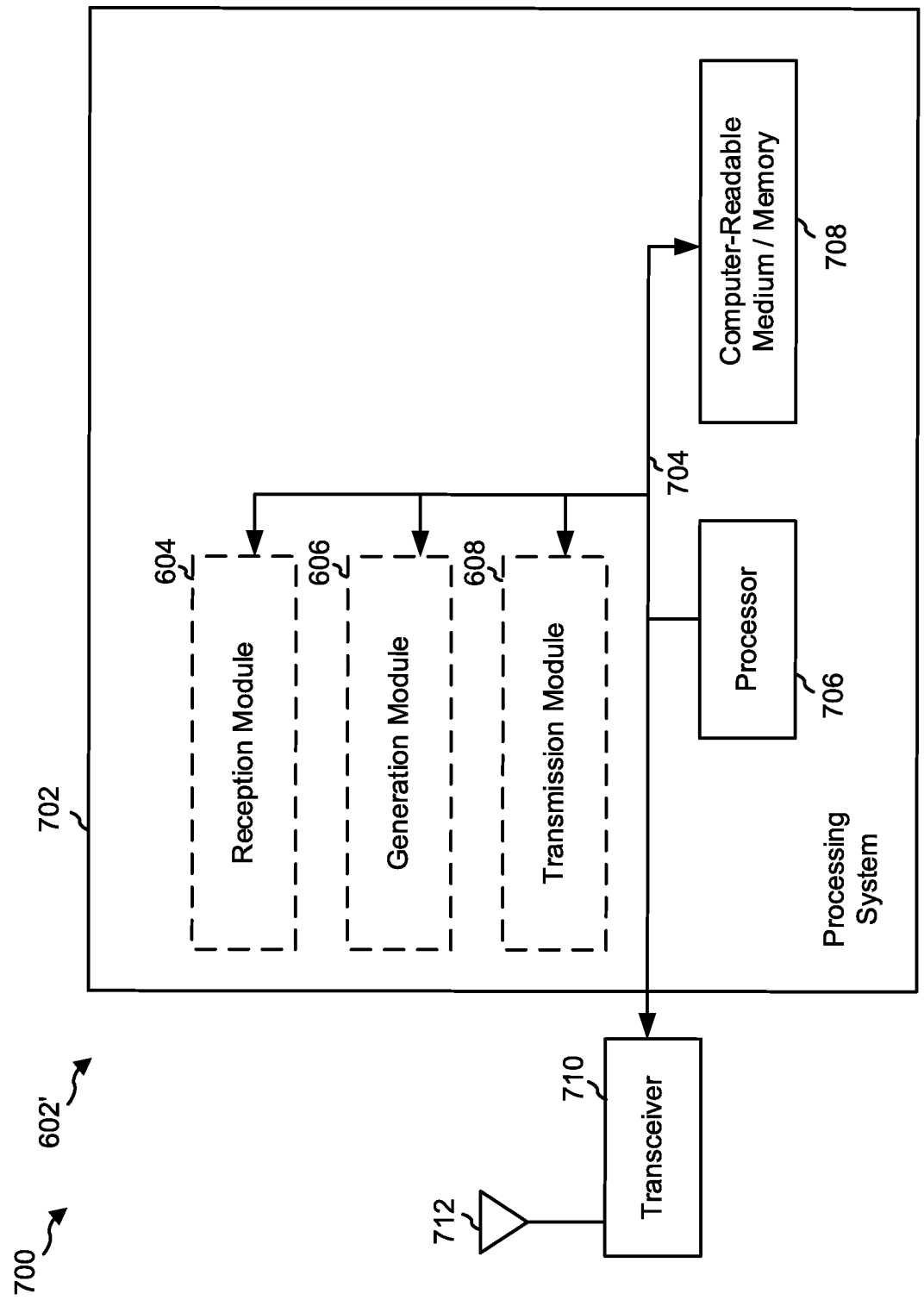
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a base station, such as an eNB, a gNB, and/or the like.

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware modules, represented by the processor 706, the modules 604, 606, 608, and the computer-readable medium/memory 708. The bus 704 may also link various other circuits such as timing sources, peripherals, voltage regulators, and power management circuits, which are well known in the art, and therefore, will not be described any further.

The processing system 702 may be coupled to a transceiver 710. The transceiver 710 is coupled to one or more antennas 712. The transceiver 710 provides a means for communicating with various other apparatus over a transmission medium. The transceiver 710 receives a signal from the one or more antennas 712, extracts information from the received signal, and provides the extracted information to the processing system 702, specifically the reception module 604. In addition, the transceiver 710 receives information from the processing system 702, specifically the transmission module 608, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described supra for any particular apparatus. The computer-readable medium/memory 708 may also be used for storing data that is manipulated by the processor 706 when executing software. The processing system further includes at least one of the modules 604, 606, and 608. The modules may be software modules running in the processor 706, resident/stored in the computer-readable medium/memory 708, one or more hardware modules coupled to the processor 706, or some combination thereof. The processing system 902 may be a component of the BS 110 and may include the memory 242 and/or at least one of the TX MIMO processor 230, the receive processor 238, and/or the controller/processor 240.

In some aspects, the apparatus 602/602' for wireless communication includes means for generating a wakeup signal for at least one UE of a UE group, means for transmitting the wakeup signal to the at least one UE, and/or the like. The aforementioned means may be one or more of the aforementioned modules of the apparatus 602 and/or the processing system 702 of the apparatus 602' configured to perform the functions recited by the aforementioned means. As described supra, the processing system 702 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 7 is provided as an example. Other examples are possible and may differ from what was described in connection with FIG. 7.

Figure 8:
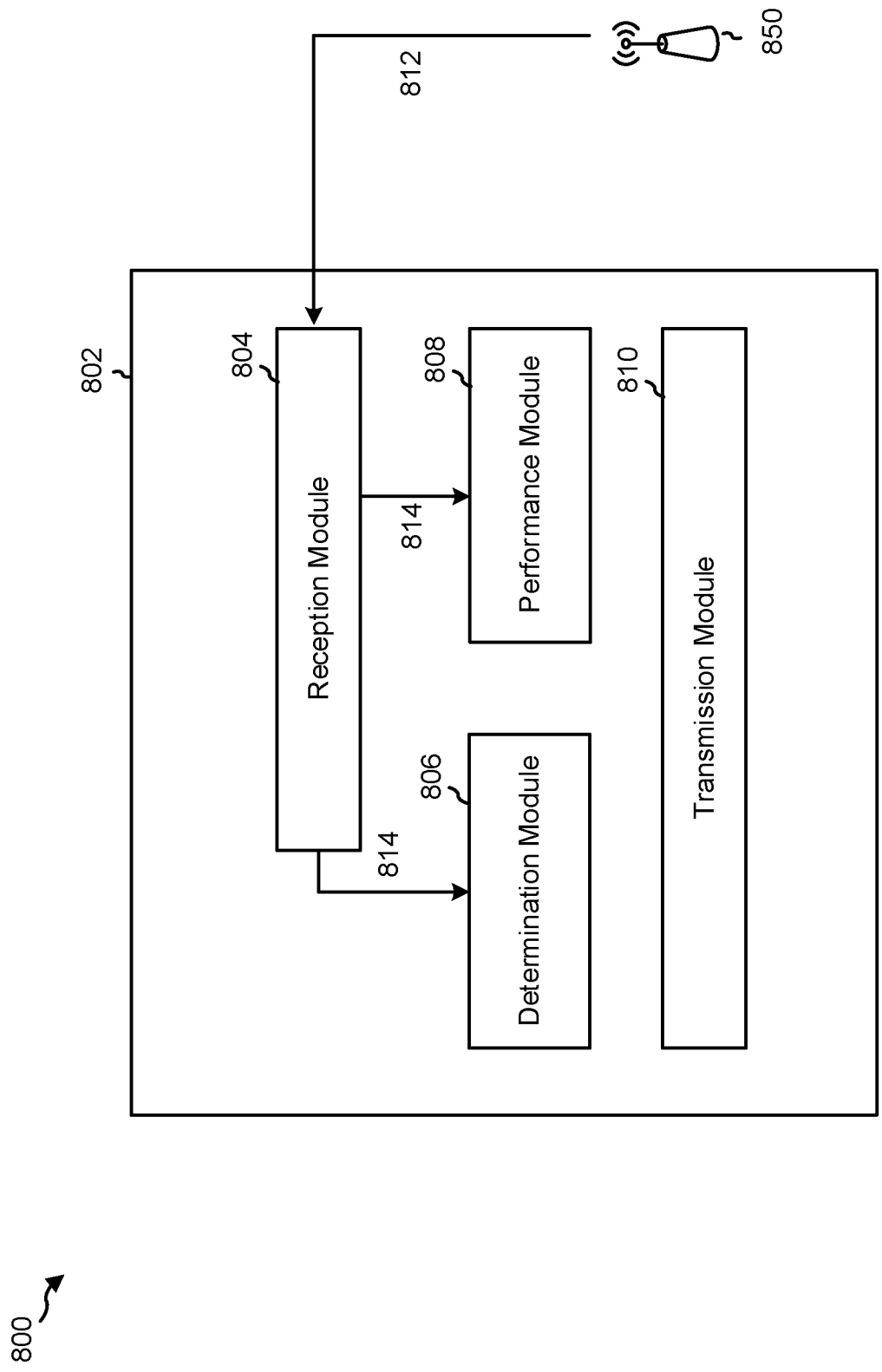
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a determination module 806, a performance module 808, and/or a transmission module 810.

The reception module 804 may receive signals 812 from a BS 850. The signals 812 may include a wakeup signal. For example, the reception module 804 may detect the wakeup signal. The reception module may provide data 814 to the determination module 806 and/or the performance module 808. The data 814 may identify the wakeup signal. The determination module 806 may determine that the wakeup signal is associated with the apparatus 802 based at least in part on the wakeup signal being for a UE group that includes the apparatus 802. The performance module 808 may perform synchronization based at least in part on the wakeup signal. The transmission module 810 may transmit information of the apparatus 802.

The apparatus may include additional modules that perform each of the blocks of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
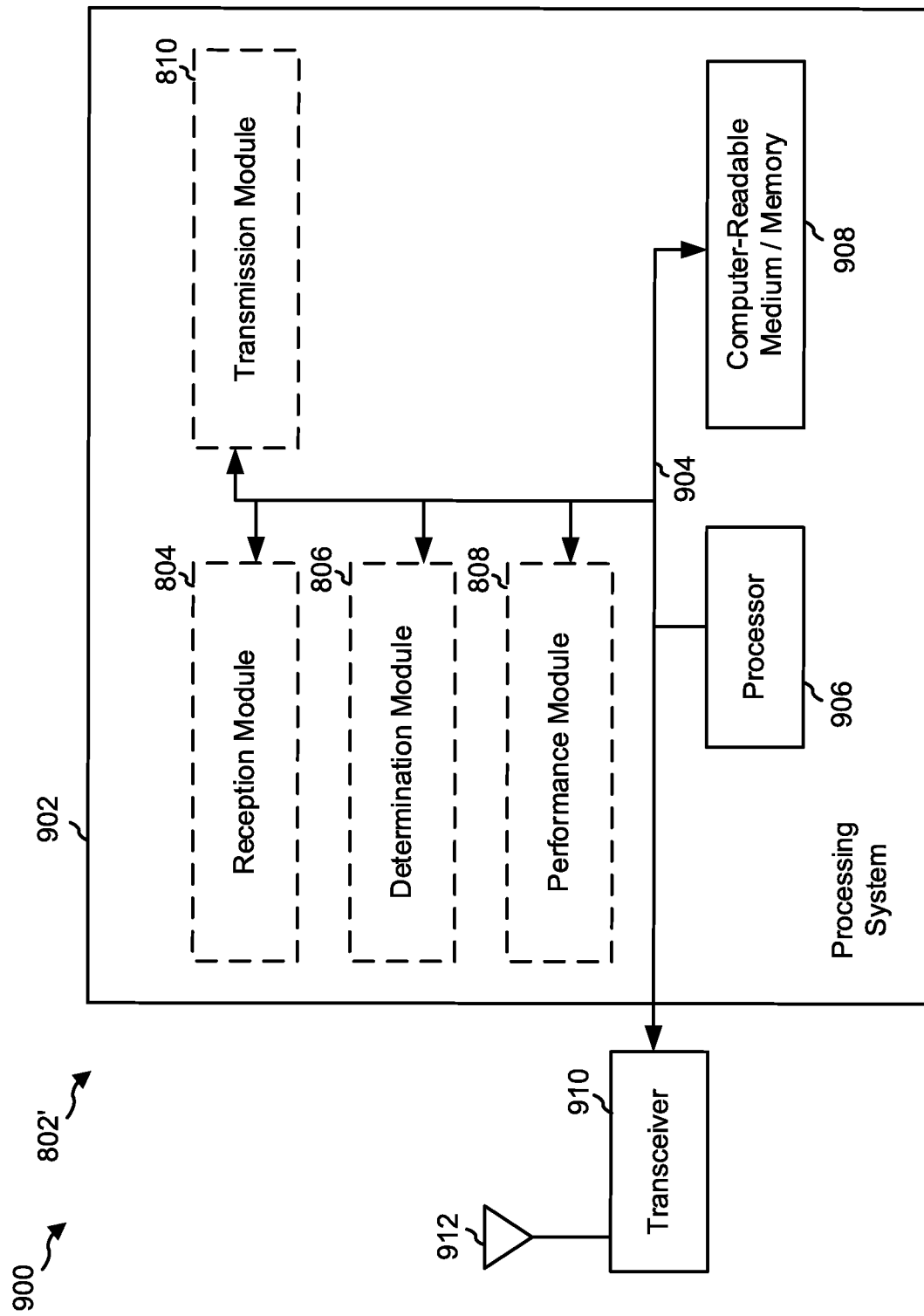
FIG. 9 is a diagram illustrating an example of a hardware implementation for an apparatus employing a processing system.

FIG. 9 is a diagram illustrating an example 900 of a hardware implementation for an apparatus 802' employing a processing system 902. The apparatus 802' may be a UE (e.g., the UE 120 and/or the like).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, and 810. The modules may be software modules running in the processor 906, resident/stored in the computer-readable medium/memory 908, one or more hardware modules coupled to the processor 906, or some combination thereof. The processing system 902 may be a component of the UE 120 and may include the memory 282 and/or at least one of the TX MIMO processor 266, the receive processor 258, and/or the controller/processor 280.

In some aspects, the apparatus 802/802' for wireless communication includes means for determining that a wakeup signal detected by the apparatus 802/802' is associated with the apparatus 802/802', means for receiving a communication based at least in part on the wakeup signal, means for performing synchronization using the wakeup signal based at least in part on a timing or frequency drift estimation of the apparatus 802/802', means for selecting a technique to use to detect the wakeup signal based at least in part on an operating condition or parameter of the apparatus 802/802'. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 9 is provided as an example. Other examples are possible and may differ from what was described in connection with FIG. 9.

Wakeup Signals for Guardband/Standalone User Equipment

Figure 10:
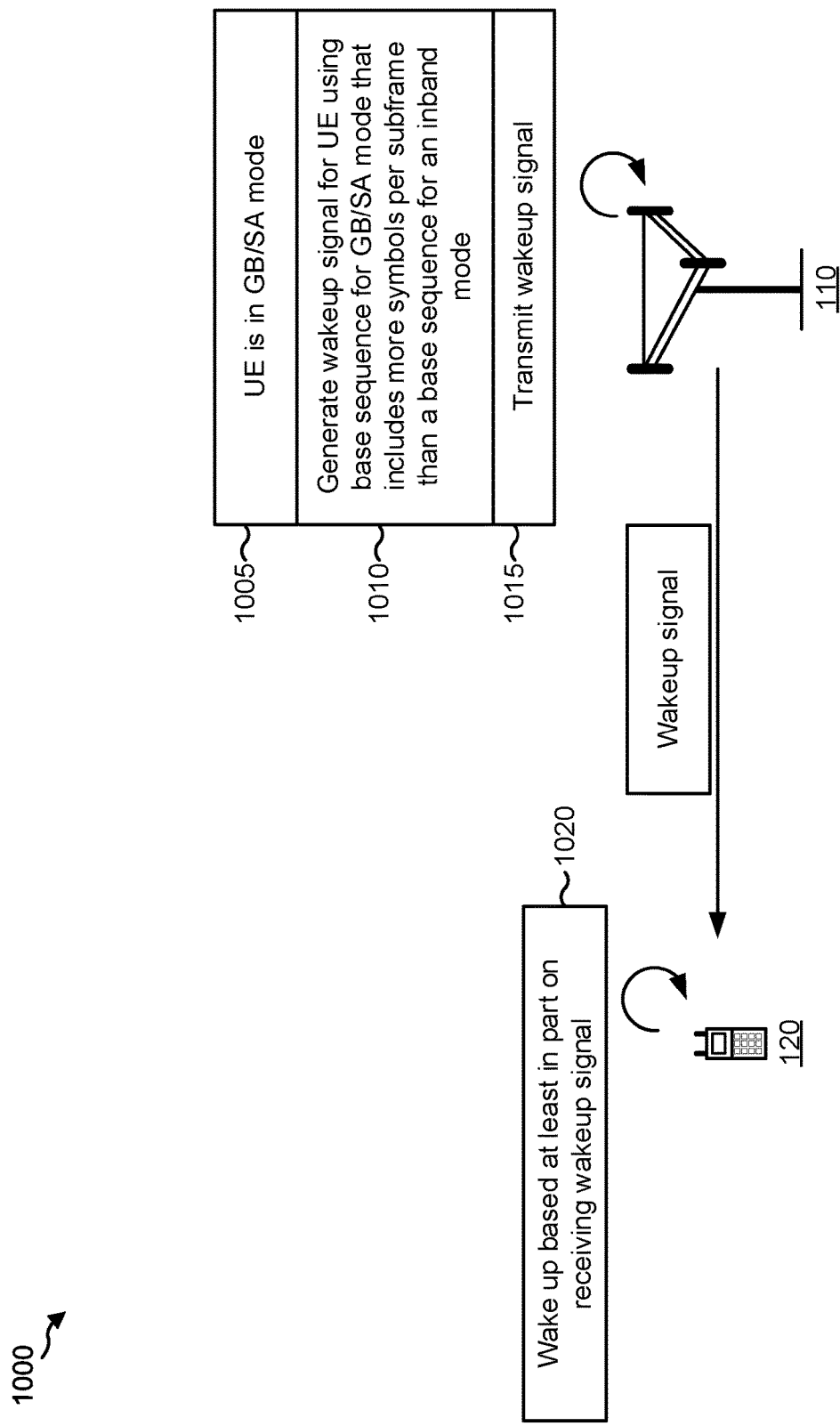
FIG. 10 is a diagram illustrating an example of generation and transmission of a wakeup signal for a UE in a guardband mode or a standalone mode.

FIG. 10 is a diagram illustrating an example 1000 of generation and transmission of a wakeup signal for a UE in a guardband mode or a standalone mode. As shown in FIG. 10, and by reference number 1005, a UE 120 may be in a GB/SA mode. In some aspects, the BS 110 may determine that the UE 120 is in the GB/SA mode (e.g., based at least in part on configuration of the UE 120, a connection type with the UE 120, information received from the UE 120 indicating that the UE 120 is in the GB/SA mode, and/or the like). In some cases, the BS 110 may determine that the UE 120 is in the GB/SA mode based on the deployment type of the BS 110.

While a single abbreviation is used for GB/SA mode, GB/SA mode may be two different modes: a guardband mode in which the UE 120 communicates in a guardband, and a standalone mode in which the UE 120 communicates using a carrier that is not associated with any other radio access technology (RAT), such as a RAT wherein a control channel does not always occupy one or more particular symbols of a subframe. Furthermore, the values, techniques, and apparatuses described herein need not be implemented identically for GB mode and SA mode. For example, a different implementation may be used for GB mode than for SA mode, or the values and techniques and apparatuses described herein may be used for only one of GB mode or SA mode. In some aspects, it may be possible to use a GB mode when deploying a carrier within a RAT that does not have a control region (e.g. a new radio (NR) carrier)).

In some aspects, a wakeup signal may have the following structure: $d_{WUS}(n) = c(m) \cdot e^{-j2\pi\theta n} \cdot e^{-j\pi u n'(n'+1)/LZC}$, wherein n'=n mod Length of ZC, and $$m = n \bmod \left( \text{Length of } RE \text{ level cover} \frac{\text{codes}}{RE} \text{level scrambling sequence } c(m) \right).$$

In some aspects, LZC (e.g., the length of the ZC sequence) may be equal to 131 for an inband mode, and may have one or more values described below in a GB/SA mode. A base sequence for an inband wakeup signal may use a 131-length ZC sequence, a 132-length cover, and an optional phase shift. The 132-length cover code may include a 127-length Gold sequence, a 127-length m sequence, or a 128-length Hadamard code.

As shown by reference number 1010, the BS 110 may generate a wakeup signal for the UE 120. For example, the BS 110 may generate the wakeup signal using a base sequence. As used herein, a base sequence may identify a value that is to be used for one or more symbols of a subframe when generating the wakeup signal. As further shown, the base sequence, which may be for a first deployment mode (e.g., the GB/SA mode) may include more symbols per subframe than a base sequence for a second deployment mode (e.g., an inband mode). As one non-limiting example, the base sequence for the GB/SA mode may include 14 symbols, and the base sequence for the inband mode may include 11 symbols. For example, a first three symbols of the base sequence for the inband mode may be used for a PDCCH of each subframe.

In some aspects, the BS 110 may generate the wakeup signal using one or more additional values that are selected from the base sequence for the inband mode. For example, the base sequence for the GB/SA mode may include the one or more additional values and the base sequence for the inband mode (e.g., an entirety of the base sequence for the inband mode or a subset of the base sequence for the inband mode). As examples, a base sequence for an inband mode may use the following sequence per subframe: [x x x 0 1 2 3 4 5 6 7 8 9 10], since the first three symbols are used for the PDCCH. In such a case, non-limiting examples of the base sequence for the GB/SA mode may include [8 9 10 0 1 2 3 4 5 6 7 8 9 10], [0 1 2 3 4 5 6 7 8 9 10 0 1 2], and [4 5 6 0 1 2 3 4 5 6 7 8 9 10], though other examples are possible and contemplated herein. In some aspects, the one or more additional values are mapped to a first 3 symbols of a first slot and are selected from the interior of the base sequence for the inband mode. In such a case, the interior of the base sequence for the inband mode includes a first 3 symbols of a second slot (e.g., [4 5 6 0 1 2 3 4 5 6 7 8 9 10]). As used herein, the interior of the base sequence refers to values not at the beginning or end of the base station. For example, the one or more additional values, for a base sequence [x x x 0 1 2 3 4 5 6 7 8 9 10], may include any one or more of the values 1, 2, 3, 4, 5, 6, 7, 8, and/or 9.

In some aspects, the examples above may be implemented by mapping a 132-length base sequence in a frequency first-time second manner to 12 subcarriers in each of the 11 symbols of a subframe (corresponding to the inband symbols [x x x 0 1 2 3 4 5 6 7 8 9 10]), and then repeating some of the symbols in the remaining 3 symbols.

In some aspects, the BS 110 may use [4 5 6 0 1 2 3 4 5 6 7 8 9 10] for the base sequence for the GB/SA mode based at least in part on a cyclic prefix length being different for different symbols of a subframe. For example, the first symbol of a slot may have a longer cyclic prefix (CP) than other symbols of the subframe. Each subframe may have two slots with 7 symbols per slot. For example, in this case, [4 5 6 0 1 2 3] may be in a first slot and [4 5 6 7 8 9 10] may be in a second slot. This may provide for the same cyclic prefix to be used for the fourth symbol of the inband base sequence, thus improving commonality between wakeup signals for the inband mode and the GB/SA mode.

In some aspects, the BS 110 may generate the base sequence for the GB/SA mode using at least one of a same sequence (e.g., a ZC sequence or another sequence) or cover code as the base sequence for the inband mode. For example, in some aspects, the BS 110 may use the 131-length ZC and the 132-length cover code of the base sequence for the inband mode to generate the base sequence. In some aspects, the BS 110 may reuse the 131-length ZC, and may use a different length of cover code (e.g., a 168-length cover code and/or the like) (168 may be selected because there are 12 subcarriers across 14 symbols). In some aspects, the BS 110 may reuse the 132-length cover codes and may use a different length of sequence (e.g., a 151-length ZC and/or the like).

In some aspects, the BS 110 may use a different sequence and a different cover code than for inband mode to generate the base sequence for the GB/SA mode. For example, the BS 110 may use a 151-length ZC and a 168-length cover code to generate the base sequence. In some aspects, the BS 110 may apply a phase shift to generate the base sequence for the GB/SA mode.

In some aspects, the BS 110 may perform time-domain scrambling of the base sequence. For example, the BS 110 may perform time-domain scrambling on a symbol level (e.g., per symbol). In some aspects, the BS 110 may vary the time-domain scrambling in time. For example, the time-domain scrambling may be different at a first time (e.g., symbol, slot, subframe, frame, etc.) than at a second time (e.g., symbol, slot, subframe, frame, etc.). In some aspects, the time-domain scrambling may be based at least in part on a pseudorandom noise (PN) sequence. For example, the PN sequence may be based at least in part on at least one of a cell identifier or a time index. In one example, the time-domain scrambling may be implemented by a scrambling in the frequency domain, wherein all the resource elements in the same OFDM symbol are scrambled by the same value. In another example, the time-domain scrambling may be combined with (e.g., multiplied by) the base sequence cover code c(m).

As shown by reference number 1015, the BS 110 may transmit the wakeup signal to the UE 120. As shown by reference number 1020, in some aspects, the UE 120 may wake up (e.g., may perform a wakeup) based at least in part on receiving the wakeup signal. In some aspects, the UE 120 may be configured with information identifying the base sequence for the GB/SA mode. In some aspects, the UE 120 may determine the base sequence for the GB/SA mode. For example, the UE 120 may perform one or more of the operations described herein to determine the base sequence for the GB/SA mode, and may detect the wakeup signal based at least in part on the base sequence for the GB/SA mode.

FIG. 10 is provided as an example. Other examples are possible and may differ from what was described in connection with FIG. 10.

Figure 11:
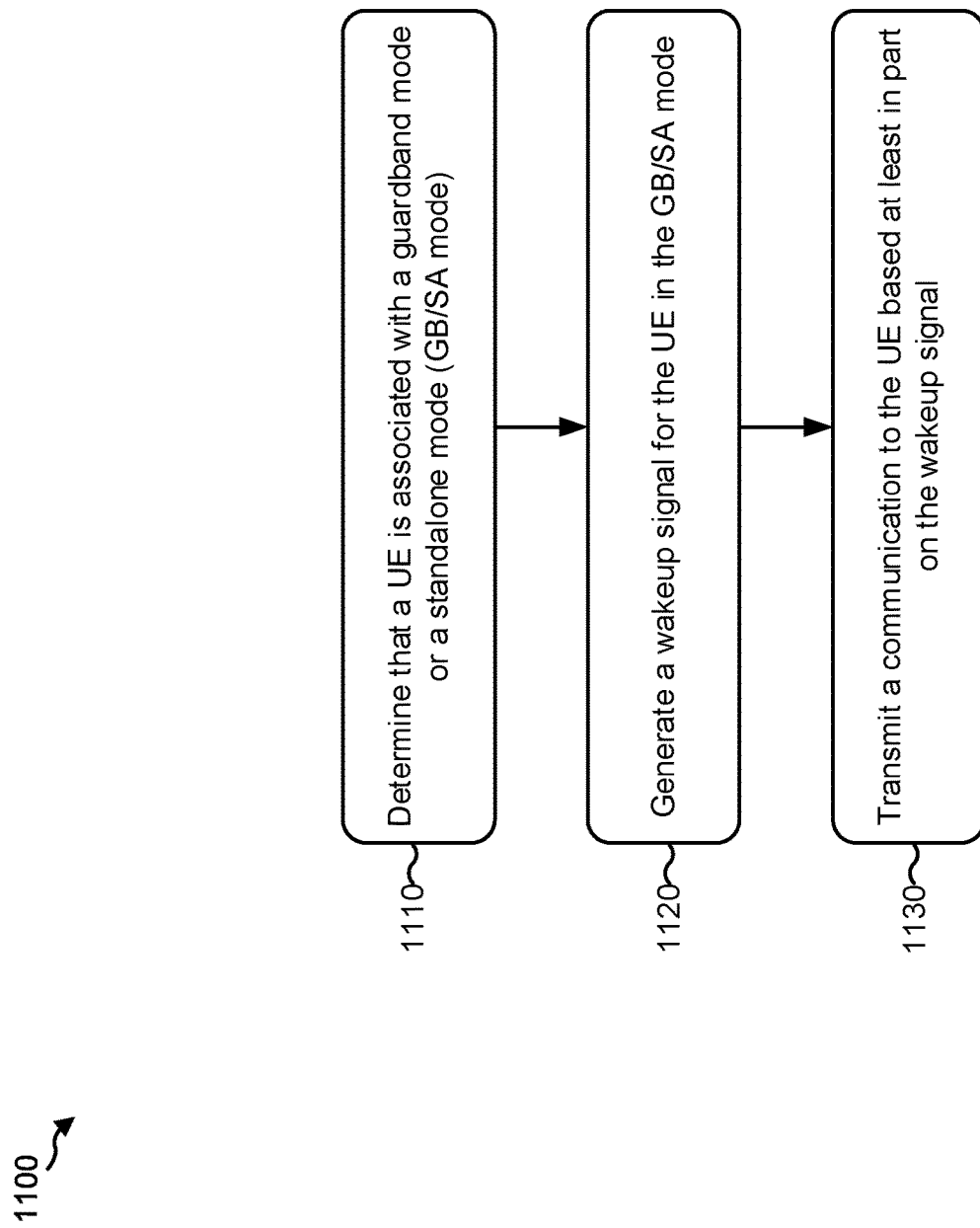
FIG. 11 is a flow chart of a method of wireless communication.

FIG. 11 is a flow chart of a method 1100 of wireless communication. The method may be performed by a base station (e.g., the BS 110 of FIG. 1, the apparatus 1202/1202', and/or the like).

At 1110, the base station may determine that a UE is associated with a guardband mode or a standalone mode. For example, the BS 110 (e.g., using controller/processor 240 and/or the like) may determine that the UE 120 is in the GB/SA mode. In some aspects, the BS 110 may determine that the UE 120 is in the GB/SA mode based at least in part on configuration of the UE 120. In some aspects, the BS 110 may determine that the UE 120 is in the GB/SA mode based at least in part on a connection type with the UE 120. In some aspects, the BS 110 may determine that the UE 120 is in the GB/SA mode based at least in part on information received from the UE 120 indicating that the UE 120 is in the GB/SA mode, and/or the like. In some aspects, the BS 110 may determine that the UE is in the GB/SA mode based on the deployment type of the BS 110.

At 1120, the base station may generate a wakeup signal for the UE in the GB/SA mode. For example, the base station (e.g., using controller/processor 240 and/or the like) may generate a wakeup signal. In some aspects, the base station may generate the wakeup signal based at least in part on a first base sequence associated with a first deployment mode. The first base sequence may include more symbols than a second base sequence associated with a second deployment mode. In some aspects, the first deployment mode may be the GB/SA mode, and the second deployment mode may be an inband mode.

In some aspects, the base sequence for the GB/SA mode includes one or more reused values that are selected from the base sequence for the inband mode, and wherein the base sequence for the GB/SA mode includes the base sequence for the inband mode. In some aspects, the one or more reused values are selected from an end of the base sequence for the inband mode. In some aspects, the one or more reused values are selected from a beginning of the base sequence for the inband mode. In some aspects, the one or more reused values are selected from an interior of the base sequence for the inband mode. In some aspects, the one or more reused values are mapped to a first 3 symbols of a first slot and are selected from the interior of the base sequence for the inband mode, and wherein the interior of the base sequence for the inband mode includes a first 3 symbols of a second slot In some aspects, the base sequence for the GB/SA mode uses a same Zadoff-Chu sequence and a same cover code as the base sequence for the inband mode. In some aspects, the base sequence for the GB/SA mode uses a same Zadoff-Chu sequence and a different cover code than the base sequence for the inband mode. In some aspects, the base sequence for the GB/SA mode uses a different Zadoff-Chu sequence and a same cover code as the base sequence for the inband mode.

In some aspects, the base sequence for the GB/SA mode is generated using a different Zadoff-Chu sequence and a different cover code than a base sequence for an inband mode. In some aspects, the Zadoff-Chu sequence for the base sequence for the GB/SA mode is a 151-length Zadoff-Chu sequence. In some aspects, the cover code for the base sequence for the GB/SA mode is a 168-length cover code. In some aspects, the cover code for the base sequence for the GB/SA mode is based at least in part on at least one of a truncated 255-length Gold sequence, a 255-length m sequence, or a 256-length Hadamard code. For example, the wakeup signal with 151-length ZC sequence, and 168-length cover codes generated by using 255-length Gold sequence, is given below:

$$d(n) = b(m)e^{-j2\pi\theta_f n}e^{-j\frac{\pi u n'(n'+1)}{151}}$$

$$n = 0, 1, \ldots, 151; n' = n \bmod 151; m = n \bmod 168$$

$$u = N_{ID}^{cell} \bmod 126 + 3$$

$$b(m) = [1 - 2x_0((m+m_0) \bmod 255)][1 - 2x_1((m+m_1) \bmod 255)]$$

$$m_0 = \left\lfloor \frac{N_{ID}^{cell}}{126} \right\rfloor, m_1 = N_{ID}^{UE\ group} \bmod 168, 0 \le m < 255 \text{ with}$$

$$x_0(i+8) = (x_0(i+4) + x_0(i+3) + x_0(i+2) + x_0(i)) \bmod 2$$

$$x_1(i+8) = (x_0(i+6) + x_0(5) + x_0(i+4) + x_i(i)) \bmod 2,$$

initialized by $[x_0(7)\ x_0(6)\ x_0(5)\ x_0(4)\ x_0(3)\ x_0(2)\ x_0(1)\ x_0(0)] = [0\ 0\ 0\ 0\ 0\ 0\ 0\ 1]$ $[x_1(7)\ x_1(6)\ x_1(5)\ x_1(4)\ x_1(3)\ x_1(2)\ x_1(1)\ x_1(0)] = [0\ 0\ 0\ 0\ 0\ 0\ 0\ 1]$ wherein the root of the ZC sequence is based at least in part on a partial cell ID and the initialization values for the Gold sequence are similar to (e.g., equal to, a modification of) that of the inband wakeup signal.

If there is no UE group ID, the cover codes may be simplified as a truncated 255-length m sequence, illustrated by $$b(m) = [1 - 2x_0((m+m_0) \bmod 255)]$$

$$m_0 = \left\lfloor \frac{N_{ID}^{cell}}{126} \right\rfloor, 0 \le m < 255 \text{ with}$$

$$x_0(i+8) = (x_0(i+4) + x_0(i+3) + x_0(i+2) + x_0(i)) \bmod 2,$$

initialized by $[x_0(7)\ x_0(6)\ x_0(5)\ x_0(4)\ x_0(3)\ x_0(2)\ x_0(1)\ x_0(0)] = [0\ 0\ 0\ 0\ 0\ 0\ 0\ 1]$.

In some aspects, time-domain scrambling of the base sequence for the GB/SA mode is performed on a symbol level and varied in time. In some aspects, the time-domain scrambling is based at least in part on a pseudorandom noise (PN) sequence that is based at least in part on at least one of a cell identifier or a time index combined with the base sequence for the GB/SA mode per subframe.

In some aspects, the first base sequence includes the second base sequence, and includes one or more additional values from the second base sequence. In some aspects, the one or more additional values are selected from an interior of the second base sequence. In some aspects, the one or more additional values are mapped to a first 3 symbols of a first slot in a subframe and are selected from the interior of the second base sequence, and wherein the interior of the second base sequence includes a first 3 symbols of a second slot in the subframe. In some aspects, the first base sequence is generated using a same Zadoff-Chu sequence and a same cover code as the second base sequence.

In some aspects, time-domain scrambling of the first base sequence is performed on a symbol level and is varied in time. In some aspects, the time-domain scrambling is based at least in part on a pseudorandom noise (PN) sequence that is based at least in part on at least one of a cell identifier or a time index combined with the first base sequence per subframe.

At 1130, the base station may transmit the wakeup signal. For example, the base station (e.g., using controller/processor 240, transmit processor 220, TX MIMO processor 230, MOD 232, antenna 234, and/or the like) may transmit the wakeup signal to the UE. In some aspects, the UE may perform a wakeup based at least in part on receiving the wakeup signal. In some aspects, the wakeup signal may be transmitted to a group of UEs.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
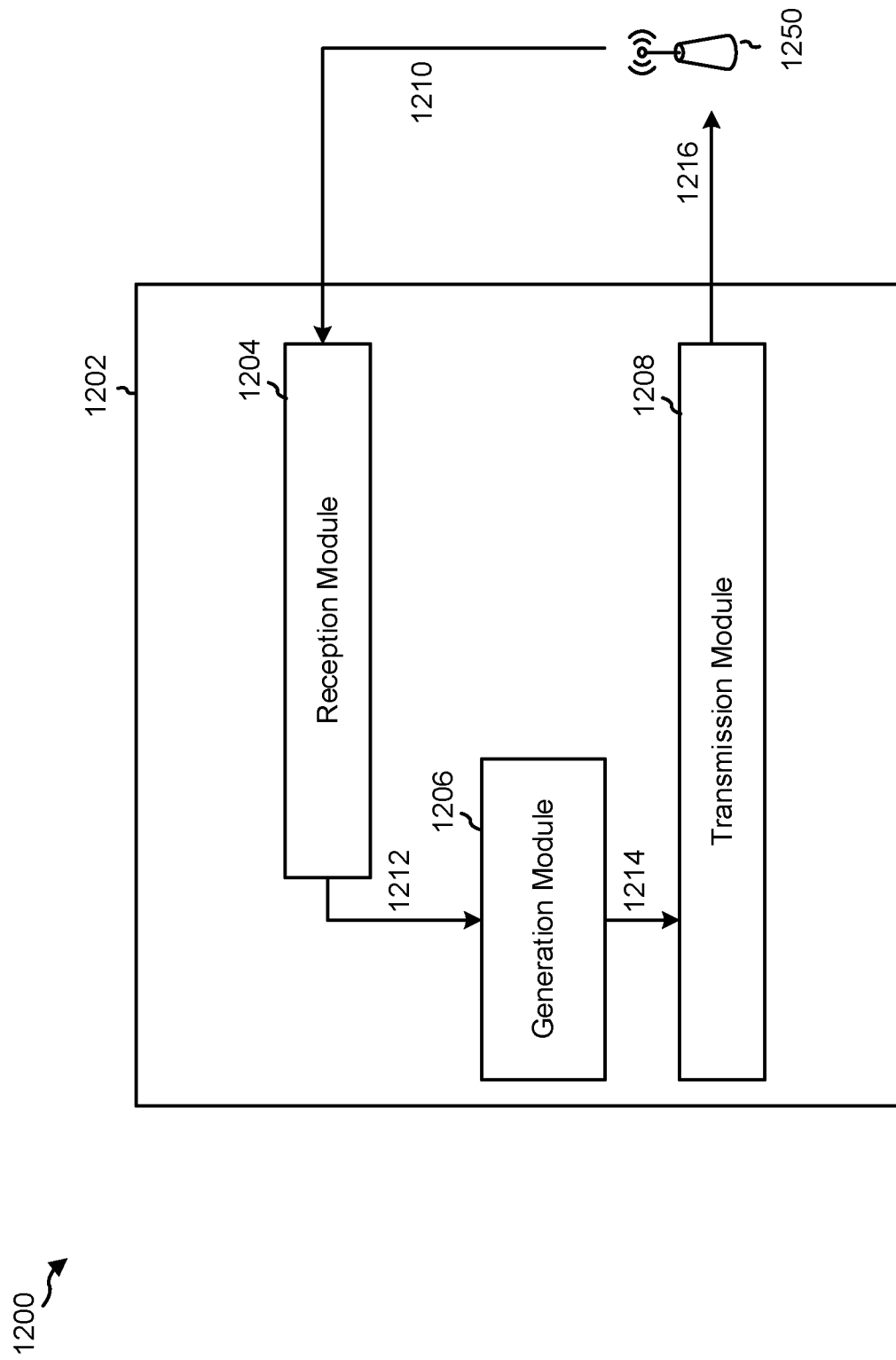
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be base station, such as an eNB, a gNB, and/or the like. In some aspects, the apparatus 1202 includes a reception module 1204, a generation module 1206, and/or a transmission module 1208.

The reception module 1204 may receive data 1210 from a UE 1250 (e.g., UE 120 and/or the like). In some aspects, the data 1210 may indicate that the UE 1250 is associated with a first deployment mode (e.g., a GB/SA mode). In some aspects, the reception module 1204 may provide data 1212 indicating that the UE 1250 is associated with the first deployment mode.

The generation module may generate a wakeup signal for the UE 1250 in a first deployment mode, wherein the wakeup signal is generated based at least in part on a first base sequence for the first deployment mode that includes more symbols per subframe than a second base sequence for a second deployment mode (e.g., an inband mode). In some aspects, the generation module 1206 may generate the wakeup signal in connection with data 1212, received from the reception module 1204, that indicates that the UE 1250 is in the first deployment. The generation module 1206 may provide the wakeup signal as data 1214.

The transmission module 1208 may transmit the wakeup signal, received as data 1214, as signals 1216. In some aspects, the UE 1250 may receive the wakeup signal and may perform a wakeup operation based at least in part on receiving the wakeup signal.

The apparatus may include additional modules that perform each of the blocks of the algorithm in the aforementioned flow chart of FIG. 11. As such, each block in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
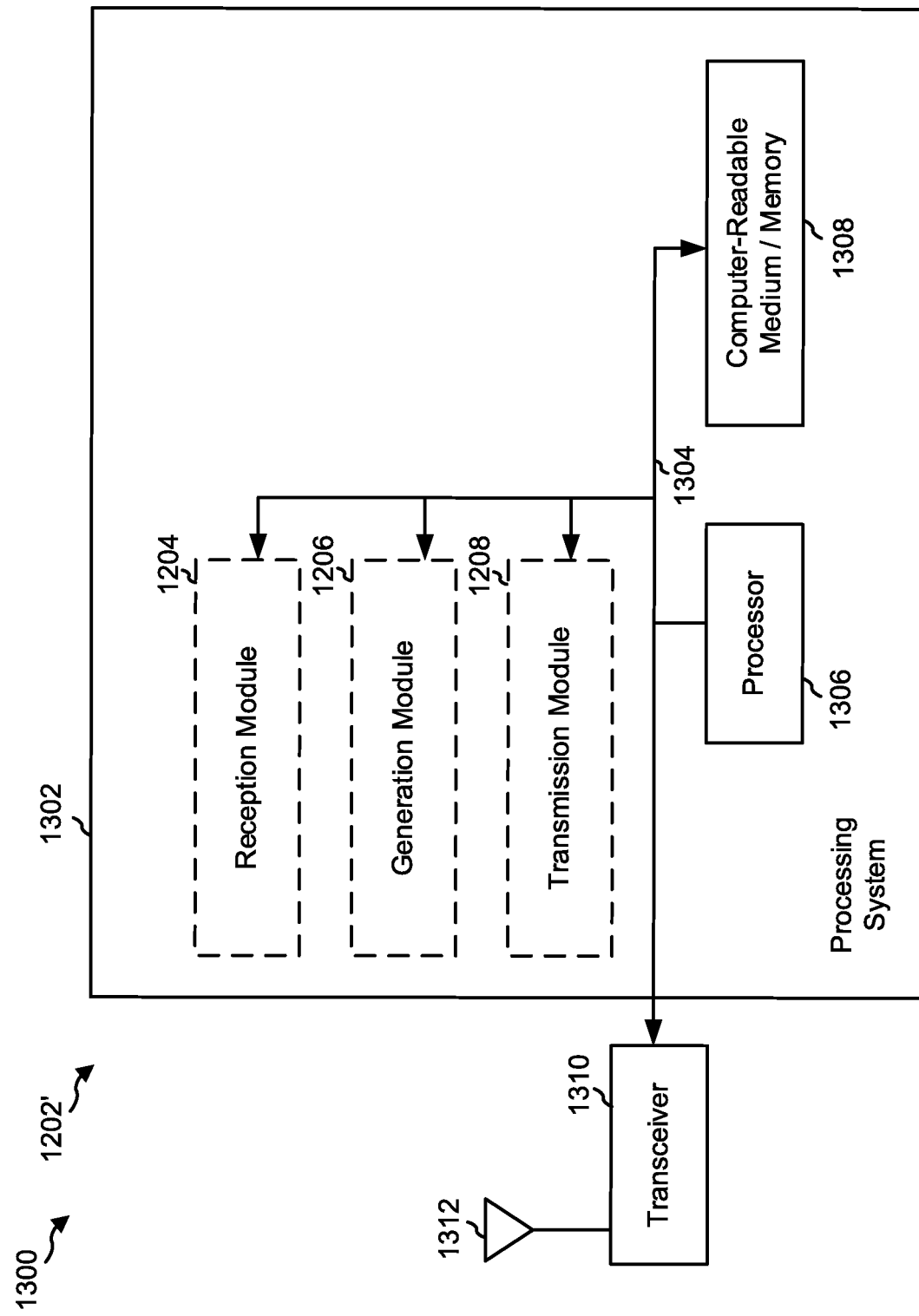
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a base station, such as an eNB, a gNB, and/or the like.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1208, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, and 1208. The modules may be software modules running in the processor 1306, resident/stored in the computer-readable medium/memory 1308, one or more hardware modules coupled to the processor 1306, or some combination thereof. The processing system 902 may be a component of the BS 110 and may include the memory 242 and/or at least one of the TX MIMO processor 230, the receive processor 238, and/or the controller/processor 240.

In some aspects, the apparatus 1202/1202' for wireless communication includes means for generating a wakeup signal for a user equipment (UE) in a guardband mode or a standalone mode, wherein the wakeup signal is based at least in part on a first base sequence associated with a first deployment mode, and the first base sequence includes more symbols than a second base sequence associated with a second deployment mode, means for transmitting the wakeup signal, and/or the like. The aforementioned means may be one or more of the aforementioned modules of the apparatus 1202 and/or the processing system 1302 of the apparatus 1202' configured to perform the functions recited by the aforementioned means. As described supra, the processing system 1302 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 13 is provided as an example. Other examples are possible and may differ from what was described in connection with FIG. 13.

Figure 14:
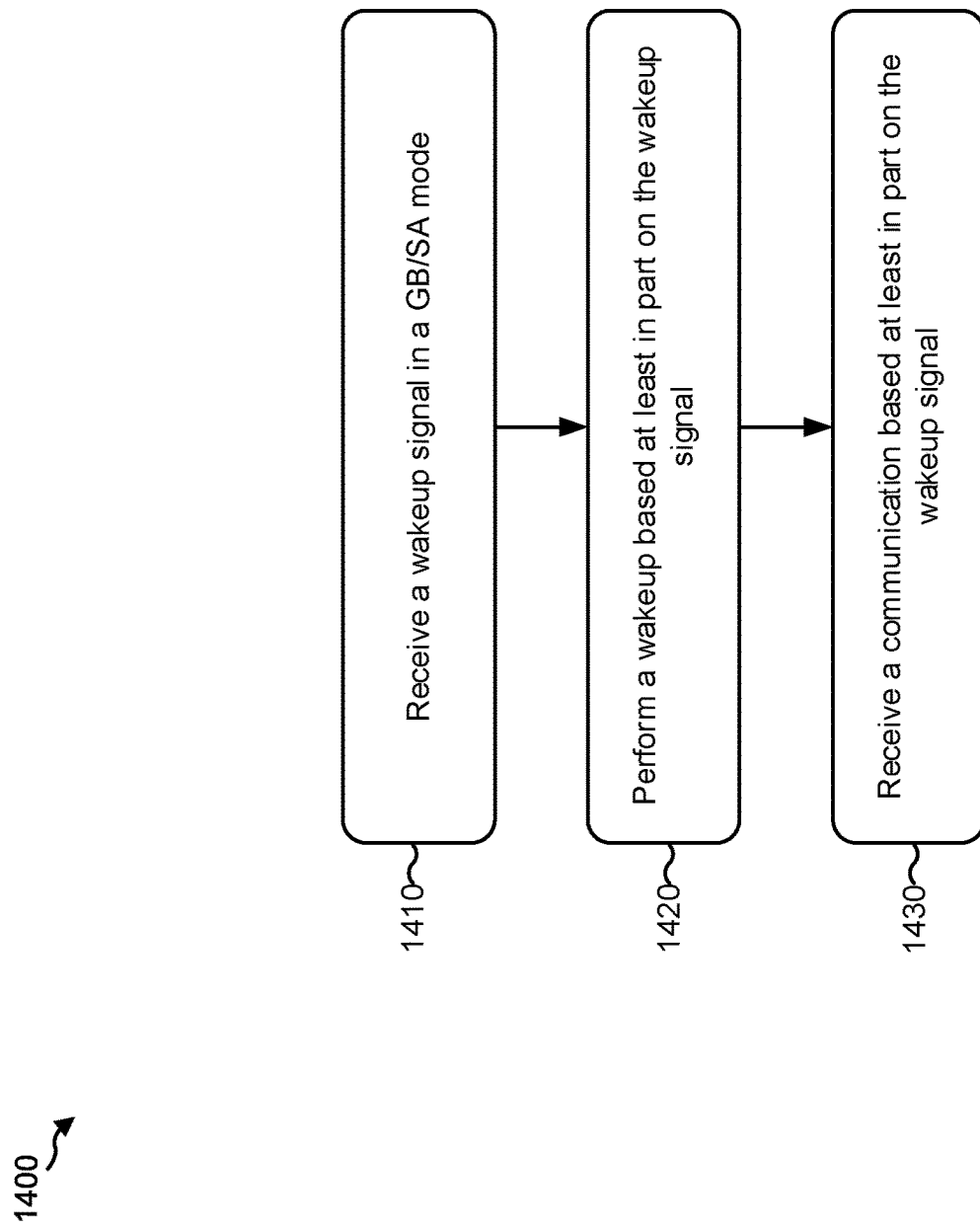
FIG. 14 is a flow chart of a method of wireless communication.

FIG. 14 is a flow chart of a method 1400 of wireless communication. The method may be performed by a UE (e.g., the UE 120 of FIG. 1, the apparatus 802/802', and/or the like).

At 1410, the UE (e.g., using antenna 252, DEMOD 254, MIMO detector 256, receive processor 258, controller/processor 280, and/or the like) may receive the wakeup signal in a GB/SA mode. For example, the UE may operate in a first deployment mode (e.g., a GB mode or an SA mode). The UE may receive a wakeup signal. For example, the UE may monitor for the wakeup signal, and may identify or detect the wakeup signal based at least in part on a preamble of the wakeup signal, a resource in which the wakeup signal is received, and/or the like. The wakeup signal may be based at least in part on a first base sequence associated with a first deployment mode. The first base sequence may include more symbols than a second base sequence associated with a second deployment mode. In some aspects, the first deployment is a GB/SA mode, and the second deployment mode is an inband mode. In some aspects, the first base sequence is a 14-symbol sequence and the second base sequence is an 11-symbol sequence.

In some aspects, the first base sequence includes the second base sequence, and includes one or more additional values from the second base sequence. In some aspects, the one or more additional values are selected from an interior of the second base sequence. In some aspects, the one or more additional values are mapped to a first 3 symbols of a first slot in a subframe and are selected from the interior of the second base sequence, and wherein the interior of the second base sequence includes a first 3 symbols of a second slot in the subframe. In some aspects, the first base sequence is generated using a same Zadoff-Chu sequence and a same cover code as the second base sequence.

In some aspects, time-domain scrambling of the first base sequence is performed on a symbol level and is varied in time. In some aspects, the time-domain scrambling is based at least in part on a pseudorandom noise (PN) sequence that is based at least in part on at least one of a cell identifier or a time index combined with the first base sequence per subframe.

At 1420, the UE (e.g., using antenna 252, DEMOD 254, MIMO detector 256, receive processor 258, controller/processor 280, and/or the like) may perform a wakeup based at least in part on the wakeup signal. For example, the UE may activate a reception module and/or the like based at least in part on the wakeup signal, as described in more detail elsewhere herein. In some aspects, the UE may identify particular resources to monitor based at least in part on the wakeup signal. For example, the UE may identify the particular resources based at least in part on the wakeup signal, a configuration associated with the wakeup signal, a gap between the wakeup signal and a communication, and/or the like.

At 1430, the UE (e.g., using antenna 252, DEMOD 254, MIMO detector 256, receive processor 258, controller/processor 280, and/or the like) may optionally receive a communication based at least in part on the wakeup signal. For example, the UE may receive the communication after a gap or delay after the wakeup signal. In some aspects, the UE may activate a reception module or receive chain to receive the communication.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

Figure 15:
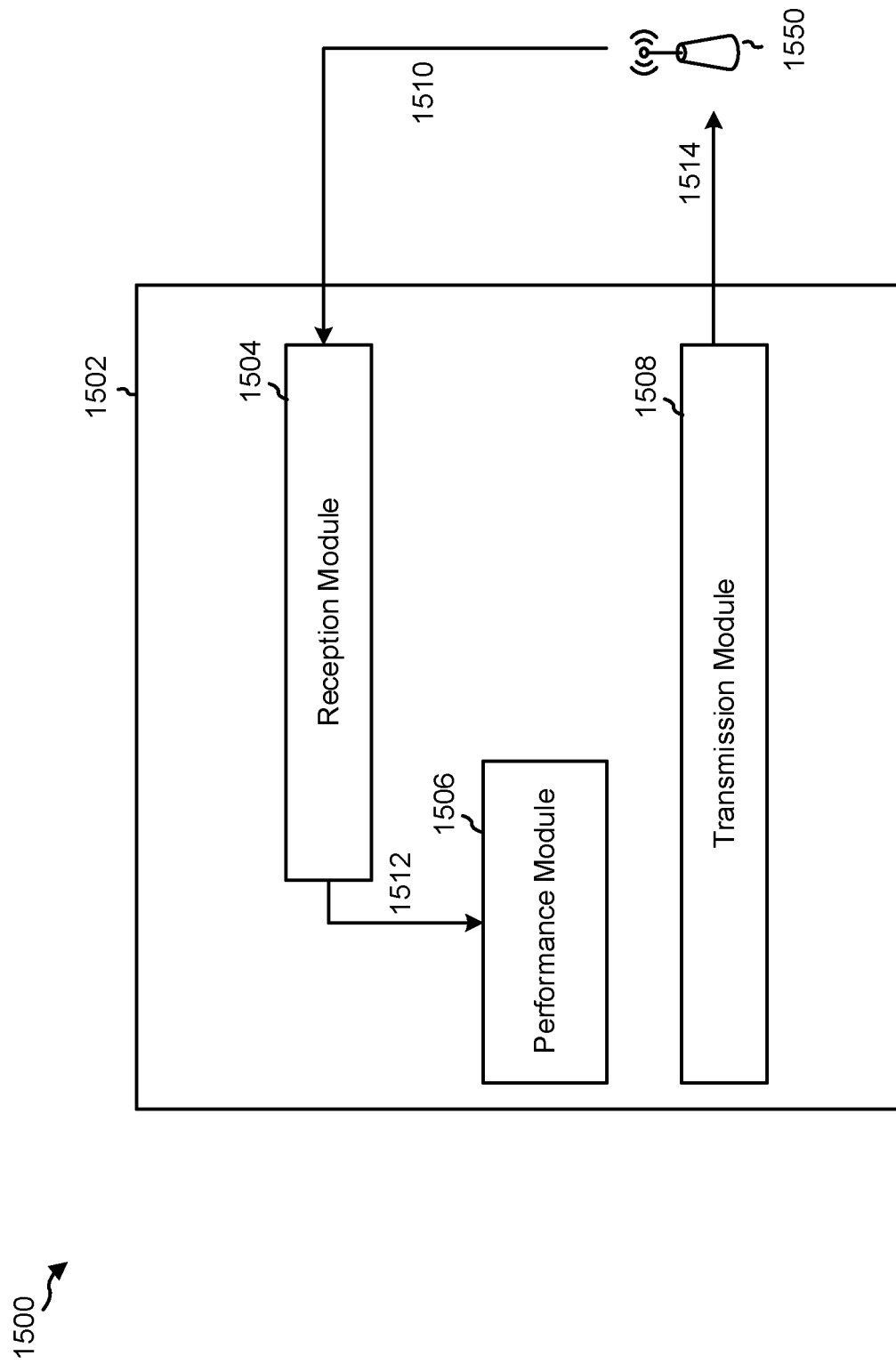
FIG. 15 is a conceptual data flow diagram illustrating the data flow between different modules/means/components in an example apparatus.

FIG. 15 is a conceptual data flow diagram 1500 illustrating the data flow between different modules/means/components in an example apparatus 1502. The apparatus 1502 may be a UE. In some aspects, the apparatus 1502 includes a reception module 1504, a performance module 1506, and/or a transmission module 1508.

The reception module 1504 may receive signals 1510 from a BS 1550. The signals 1510 may include a wakeup signal. For example, the reception module 1504 may detect the wakeup signal. In some aspects, the reception module 1504 may detect the wakeup signal based at least in part on a base sequence for a first deployment mode (e.g., the GB/SA mode) that includes more symbols than a base sequence for an a second deployment mode (e.g., the inband mode). The reception module 1504 may provide data 1512 to the performance module 1506. The data 1512 may identify the wakeup signal or may indicate to perform a wakeup based at least in part on the wakeup signal. In some aspects, the reception module 1504 may monitor for and/or receive a communication based at least in part on a wakeup signal. For example, the reception module 1504 may receive the communication after a delay or gap following the wakeup signal, and/or the like.

The performance module 1506 may perform a wakeup based at least in part on the wakeup signal. For example, the performance module may cause the apparatus 1502 (e.g., the reception module 1504 or another module or component of the apparatus 1502) to wake up, to monitor a resource associated with the wakeup signal, to receive a grant or paging associated with a communication, and/or the like. The transmission module 1508 may transmit signals 1514 to the BS 1550, such as signals to provide information identifying a capability of the UE, and/or the like.

The apparatus may include additional modules that perform each of the blocks of the algorithm in the aforementioned flow chart of FIG. 14. As such, each block in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
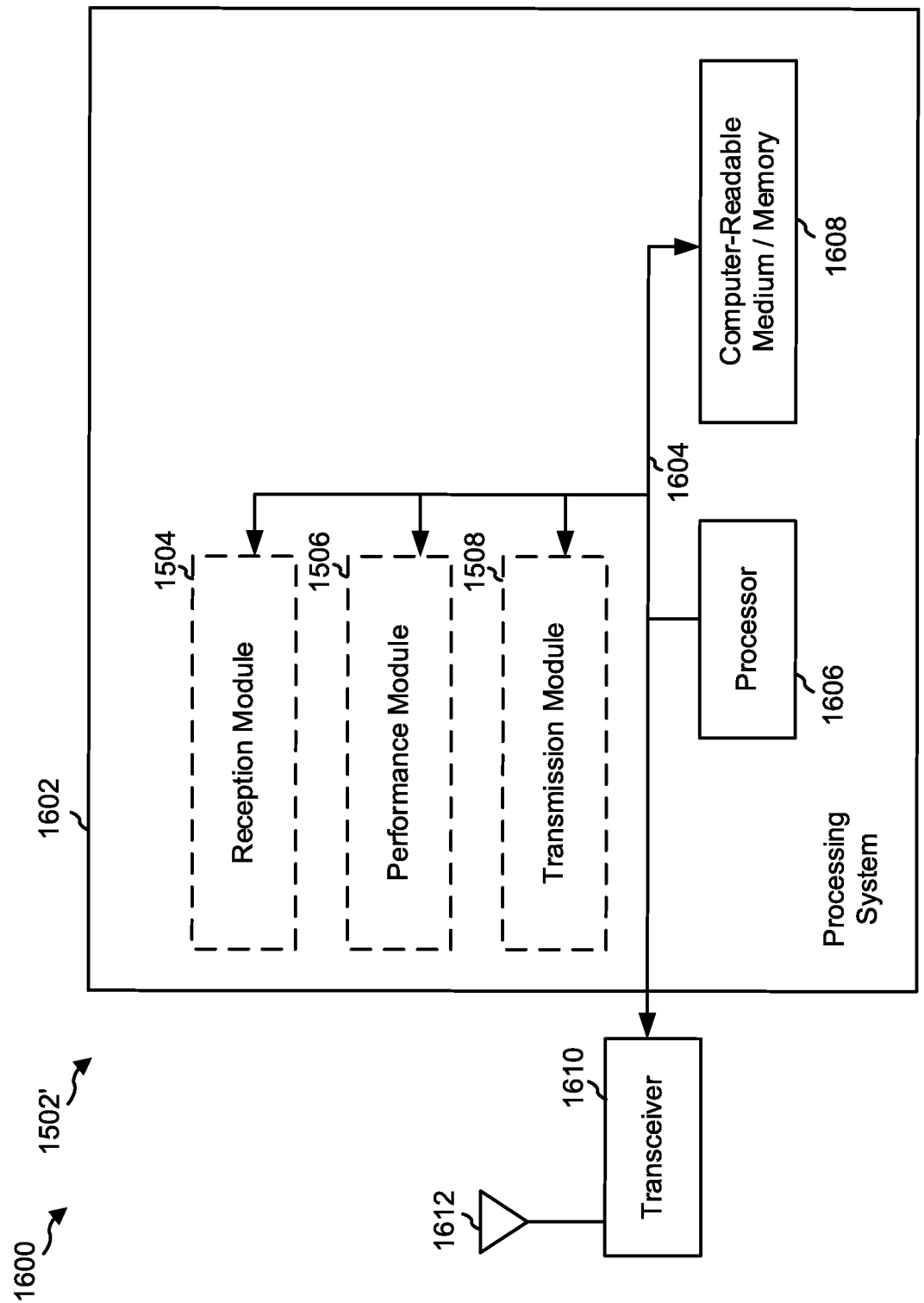
FIG. 16 is a diagram illustrating an example of a hardware implementation for an apparatus employing a processing system.

FIG. 16 is a diagram illustrating an example 1600 of a hardware implementation for an apparatus 1502' employing a processing system 1602. The apparatus 1502' may be a UE (e.g., the UE 120 and/or the like).

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, and the computer-readable medium/memory 1608. The bus 1604 may also link various other circuits such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatus over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1508, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described supra for any particular apparatus. The computer-readable medium/memory 1608 may also be used for storing data that is manipulated by the processor 1606 when executing software. The processing system further includes at least one of the modules 1504, 1506, and 1508. The modules may be software modules running in the processor 1606, resident/stored in the computer-readable medium/memory 1608, one or more hardware modules coupled to the processor 1606, or some combination thereof. The processing system 1602 may be a component of the UE 120 and may include the memory 282 and/or at least one of the TX MIMO processor 266, the receive processor 258, and/or the controller/processor 280.

In some aspects, the apparatus 1502/1502' for wireless communication includes means for receiving a wakeup signal in a guardband mode or a standalone mode (GB/SA mode), wherein the wakeup signal is based at least in part on a first base sequence associated with a first deployment mode, and the first base sequence includes more symbols than a second base sequence associated with a second deployment mode; and means for performing a wakeup based at least in part on the wakeup signal. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 16 is provided as an example. Other examples are possible and may differ from what was described in connection with FIG. 16.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a base station, comprising:
generating a wakeup signal for a user equipment (UE) in a guardband mode or a standalone mode (GB/SA mode),
wherein the wakeup signal is based at least in part on a first base sequence associated with a first deployment mode, wherein the first base sequence includes more symbols than a second base sequence associated with a second deployment mode, wherein the first base sequence includes the second base sequence, wherein the first deployment mode is the GB/SA mode, and wherein the second deployment mode is an inband mode; and
transmitting the wakeup signal.

2. The method of claim 1, where the first base sequence is a 14-symbol sequence, and the second base sequence is an 11-symbol sequence.

3. The method of claim 1, wherein the first base sequence further includes one or more additional values from the second base sequence.

4. The method of claim 3, wherein the one or more additional values are selected from an interior of the second base sequence.

5. The method of claim 4, wherein the one or more additional values are mapped to a first 3 symbols of a first slot in a subframe and are selected from the interior of the second base sequence, and wherein the interior of the second base sequence includes a first 3 symbols of a second slot in the subframe.

6. The method of claim 1, wherein the first base sequence is generated using a same Zadoff-Chu sequence and a same cover code as the second base sequence.

7. The method of claim 1, wherein time-domain scrambling of the first base sequence is performed on a symbol level and is varied in time.

8. The method of claim 7, wherein the time-domain scrambling is based at least in part on a pseudorandom noise (PN) sequence that is based at least in part on at least one of a cell identifier or a time index combined with the first base sequence per subframe.

9. A method of wireless communication performed by a user equipment (UE), comprising:
receiving a wakeup signal in a guardband mode or a standalone mode (GB/SA mode),
wherein the wakeup signal is based at least in part on a first base sequence associated with a first deployment mode, wherein the first base sequence includes more symbols than a second base sequence associated with a second deployment mode, wherein the first base sequence includes the second base sequence, wherein the first deployment mode is the GB/SA mode, and wherein the second deployment mode is an inband mode; and performing a wakeup based at least in part on the wakeup signal.

10. The method of claim 3, wherein the one or more additional values are selected from an end of the second base sequence.

11. The method of claim 9, where the first base sequence is a 14-symbol sequence, and the second base sequence is an 11-symbol sequence.

12. The method of claim 9, wherein the first base sequence further includes one or more additional values from the second base sequence.

13. The method of claim 12, wherein the one or more additional values are selected from an interior of the second base sequence.

14. The method of claim 13, wherein the one or more additional values are mapped to a first 3 symbols of a first slot in a subframe and are selected from the interior of the second base sequence, and wherein the interior of the second base sequence includes a first 3 symbols of a second slot in the subframe.

15. The method of claim 9, wherein the first base sequence is generated using a same Zadoff-Chu sequence and a same cover code as the second base sequence.

16. The method of claim 9, wherein time-domain scrambling of the first base sequence is performed on a symbol level and is varied in time.

17. The method of claim 16, wherein the time-domain scrambling is based at least in part on a pseudorandom noise (PN) sequence that is based at least in part on at least one of a cell identifier or a time index combined with the first base sequence per subframe.

18. The method of claim 12, wherein the one or more additional values are selected from an end of the second base sequence.

19. A user equipment (UE) for wireless communication, comprising:
a memory; and
one or more processors operatively coupled to the memory, the memory and the one or more processors configured to:
receive a wakeup signal in a guardband mode or a standalone mode (GB/SA mode),
wherein the wakeup signal is based at least in part on a first base sequence associated with a first deployment mode, wherein the first base sequence includes more symbols than a second base sequence associated with a second deployment mode, wherein the first base sequence includes the second base sequence,
wherein the first deployment mode is the GB/SA mode, and wherein the second deployment mode is an inband mode; and
perform a wakeup based at least in part on the wakeup signal.

20. The UE of claim 19, where the first base sequence is a 14-symbol sequence, and the second base sequence is a 11-symbol sequence.

21. The UE of claim 19, wherein the first base sequence further includes one or more additional values from the second base sequence.

22. The UE of claim 21, wherein the one or more additional values are selected from an interior of the second base sequence.

23. The UE of claim 22, wherein the one or more additional values are mapped to a first 3 symbols of a first slot in a subframe and are selected from the interior of the second base sequence, and wherein the interior of the second base sequence includes a first 3 symbols of a second slot in the subframe.

24. The UE of claim 19, wherein the first base sequence is generated using a same Zadoff-Chu sequence and a same cover code as the second base sequence.

25. The UE of claim 19, wherein time-domain scrambling of the first base sequence is performed on a symbol level and is varied in time.

26. The UE of claim 25, wherein the time-domain scrambling is based at least in part on a pseudorandom noise (PN) sequence that is based at least in part on at least one of a cell identifier or a time index combined with the first base sequence per subframe.

27. The UE of claim 21, wherein the one or more additional values are selected from an end of the second base sequence.

28. A base station for wireless communication, comprising:
a memory; and
one or more processors operatively coupled to the memory, the memory and the one or more processors configured to:
generate a wakeup signal for a user equipment (UE) in a guardband mode or a standalone mode (GB/SA mode),
wherein the wakeup signal is based at least in part on a first base sequence associated with a first deployment mode, wherein the first base sequence includes more symbols than a second base sequence associated with a second deployment mode, wherein the first base sequence includes the second base sequence,
wherein the first deployment mode is the GB/SA mode, and wherein the second deployment mode is an inband mode; and
transmit the wakeup signal.

29. The base station of claim 28, where the first base sequence is a 14-symbol sequence, and the second base sequence is a 11-symbol sequence.

30. The base station of claim 28, wherein the first base sequence further includes one or more additional values from the second base sequence.

31. The base station of claim 30, wherein the one or more additional values are selected from an interior of the second base sequence.

32. The base station of claim 31, wherein the one or more additional values are mapped to a first 3 symbols of a first slot in a subframe and are selected from the interior of the second base sequence, and wherein the interior of the second base sequence includes a first 3 symbols of a second slot in the subframe.

33. The base station of claim 28, wherein the first base sequence is generated using a same Zadoff-Chu sequence and a same cover code as the second base sequence.

34. The base station of claim 28, wherein time-domain scrambling of the first base sequence is performed on a symbol level and is varied in time.

35. The base station of claim 34, wherein the time-domain scrambling is based at least in part on a pseudorandom noise (PN) sequence that is based at least in part on at least one of a cell identifier or a time index combined with the first base sequence per subframe.

36. The base station of claim 30, wherein the one or more additional values are selected from an end of the second base sequence.

* * * * *